(12) United States Patent
Pohl et al.

(10) Patent No.: US 11,087,152 B2
(45) Date of Patent: Aug. 10, 2021

(54) INFRASTRUCTURE ELEMENT STATE MODEL AND PREDICTION

(71) Applicant: Intel Corporation, Santa Clara, CA (US)

(72) Inventors: Daniel Pohl, Puchheim (DE); Maik Fox, Karlsruhe (DE)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 16/233,150

(22) Filed: Dec. 27, 2018

(65) Prior Publication Data

US 2019/0130199 A1 May 2, 2019

(51) Int. Cl.
| | |
|---|---|
| *G06K 9/00* | (2006.01) |
| *G08G 1/095* | (2006.01) |
| *G08G 1/01* | (2006.01) |
| *G08G 1/07* | (2006.01) |
| *G06N 5/04* | (2006.01) |

(52) U.S. Cl.
CPC ......... *G06K 9/00825* (2013.01); *G06N 5/04* (2013.01); *G08G 1/0145* (2013.01); *G08G 1/07* (2013.01); *G08G 1/095* (2013.01)

(58) Field of Classification Search
CPC ...... G06K 9/00825; G08G 1/095; G08G 1/07; G08G 1/0145; G08G 1/09623; G08G 1/0129; G08G 1/096716; G08G 1/096827; G08G 1/096844; G08G 1/096775; G08G 1/096741; G08G 1/0141; G08G 1/065; G08G 1/052; G08G 1/0112; G08G 1/0133; G06N 5/04
See application file for complete search history.

(56) References Cited

U.S. PATENT DOCUMENTS

| | | | | |
|---|---|---|---|---|
| 2008/0094250 A1* | 4/2008 | Myr | ......................... | G08G 1/04 340/909 |
| 2011/0037619 A1* | 2/2011 | Ginsberg | ......... | G08G 1/096844 340/910 |

(Continued)

OTHER PUBLICATIONS

International Search Report issued for corresponding WO application PCT/US2019/063485, dated Mar. 20, 2020, 12 pages (for informational purpose only).

*Primary Examiner* — Brian P Sweeney
(74) *Attorney, Agent, or Firm* — VIERING, JENTSCHURA & PARTNER mbB

(57) ABSTRACT

Herein is disclosed an infrastructure state prediction device comprising a memory device onto which an infrastructure state model corresponding to a location and a state timing of a plurality of infrastructure elements is stored; one or more processors, communicatively coupled to the memory device and configured to receive measurement information representing a location and an observed state of a first infrastructure element; determine a predicted state of a second infrastructure element based on a state timing corresponding to a second infrastructure element; determine a movement information based on the observed state of the first infrastructure element, the predicted state of the second infrastructure element and a relation between the location of the first infrastructure element and a location of the second infrastructure element; and generate a message comprising the movement information.

18 Claims, 14 Drawing Sheets

(56) References Cited

U.S. PATENT DOCUMENTS

2017/0330456 A1 11/2017 Miller et al.
2018/0037162 A1 2/2018 Yonezawa et al.
2018/0065549 A1 3/2018 Watanabe et al.

* cited by examiner

INFRASTRUCTURE ELEMENT STATE MODEL AND PREDICTION

TECHNICAL FIELD

Various aspects of the disclosure relate generally to the recognition of predetermined characteristics from image data, the logical analysis of the predetermined characteristics to predict an outcome, and the determination of an instruction based on the predicted outcome.

BACKGROUND

Traffic control devices, including, but not limited to, stoplights, walk signs, and any other lights to direct or control traffic (referred to herein as "infrastructure elements") are ubiquitous. Although infrastructure elements promote order and safety, they may function by serially distributing a right-of-way among drivers with competing interests. This may occur according to a fixed timing schedule, wherein each of the red, yellow, and green lights is afforded a pre-specified time until the light changes to the next color. This may also occur according to a dynamic timing schedule, in which the infrastructure element dynamically reacts to one or more switches or sensors, such as the pressing of a pedestrian crossing button, or the determination from the output of one or more sensors that a vehicle is present in a vicinity of the infrastructure element. No matter how the traffic control system is implemented, the ability of one driver to proceed is predicated upon the need of another driver to yield. Infrastructure elements mandate wait times and effectively make waiting a part of driving. This increases travel times and negatively impacts fuel consumption.

Various efforts have been attempted to reduce or eliminate waiting times at infrastructure elements. Many such efforts have relied on smart traffic lights, which are capable of direct communication with vehicles, such as by transmitting one or more signaling messages to vehicles in a vicinity of the infrastructure element. Such devices have not gained widespread use and acceptance. This is likely because such devices require a significant initial investment from the corresponding municipality or state, as well as additional funds for maintenance and repair, which may be unrealistic in many jurisdictions.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
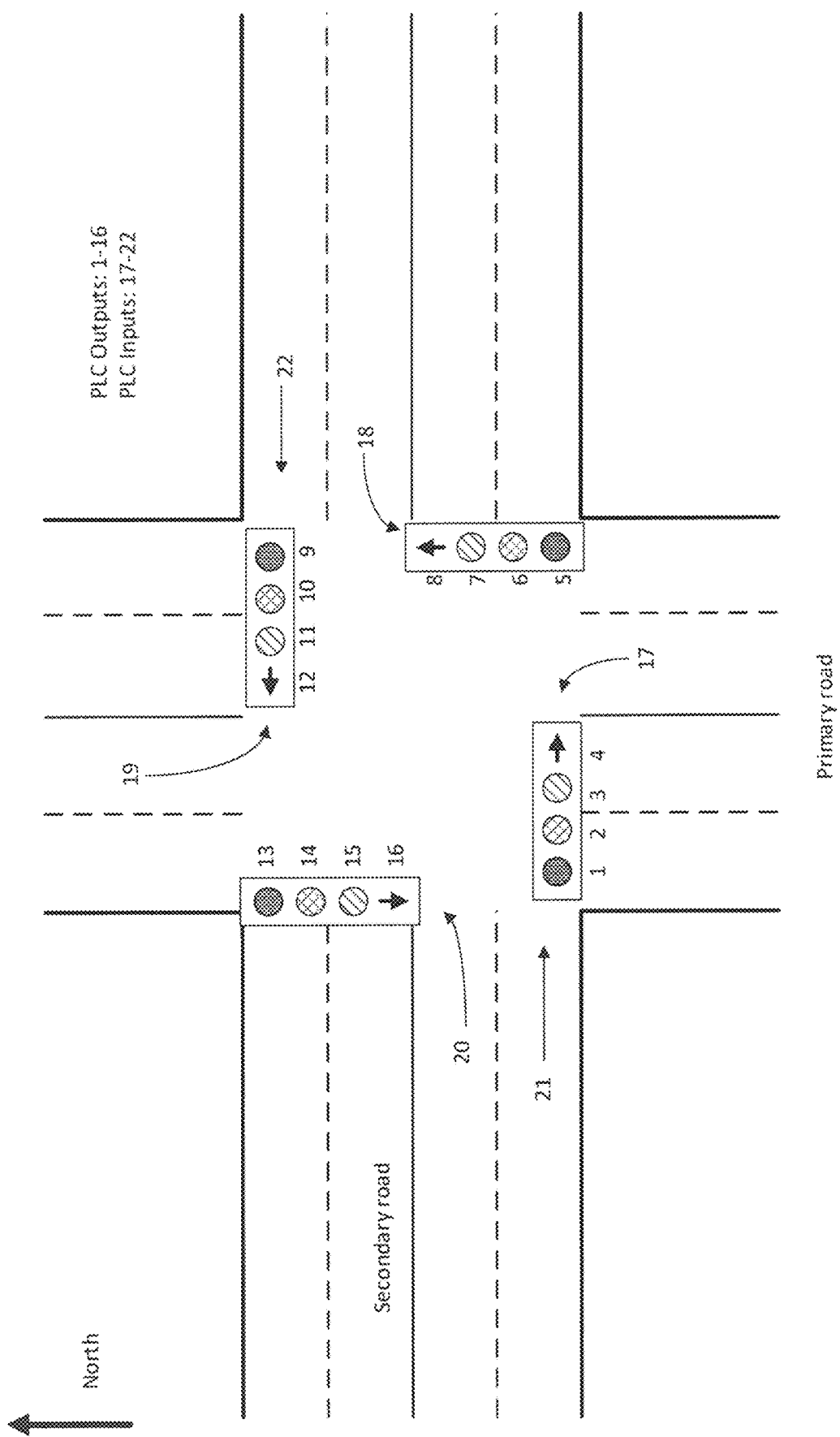
FIG. 1 shows an intersection with an infrastructure element system.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any aspect of the disclosure described herein as "exemplary" is not necessarily to be construed as preferred or advantageous over other aspects of the disclosure.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "infrastructure element" is used throughout herein to describe a device that provides a signal to vehicles and/or pedestrians to control or direct movement of said vehicles and/or pedestrians. Infrastructure elements include, but are not limited to, traffic lights or stoplights, pedestrian lights, walk/don't walk lights, railroad crossing lights, and any other lighted or controllable signs for direction or control of traffic. With respect to traffic lights or stoplights, the infrastructure element may include any configuration of said traffic lights or stoplights, including any configuration of colored solid lights, arrows, or otherwise.

Infrastructure elements, such as, for example, traffic lights, may utilize a color-coded system to distribute the right-of-way among drivers. Although the system is well-established and effective, it necessitates that some drivers wait while other drivers proceed. Because most infrastructure element installations do not allow drivers to know a state of the traffic light prior to reaching the light, drivers encounter red lights, which necessitates braking, and often stopping for lengthy periods of time. Depending on the vehicle and vehicle configuration, stopped vehicles may continue to have a running engine, which unnecessarily consumes fuel. Moreover, periods in which the vehicle is stopped are associated with driver frustration and dissatisfaction. It is accordingly preferred to reduce, minimize, or avoid periods of waiting at infrastructure elements.

In theory, many periods of waiting at an infrastructure element could be reduced or avoided altogether with the change in velocity or acceleration as the vehicle approaches the infrastructure element. Many infrastructure element timings are configured such that a vehicle traveling from a first infrastructure element to a second infrastructure element will generally approach the second infrastructure element when then second infrastructure element is illuminated red. This may be avoided by determining an appropriate velocity and/or acceleration for a traveling vehicle. That is, as the vehicle approaches the infrastructure element, a time of arrival and a predicted, corresponding state (which color is illuminated) timing (when the illumination will change from a first color to a second color) of the infrastructure element can be calculated. Based on the results of this calculation, the vehicle may be instructed when to arrive at the traffic device, such that the vehicle will not need to wait at the traffic device upon arrival. That is, the vehicle can be instructed to arrive at the infrastructure elements such that the corresponding light is green rather than red.

Previous efforts to provide such vehicle instructions have relied on "smart" infrastructure elements which may directly advise vehicles or other entities of their status, such as illumination or timing. Such infrastructure elements have not become widespread, likely due to their additional cost as compared to conventional infrastructure elements, said costs often being borne by a state or municipality. Moreover, as additional infrastructure elements are installed in developing countries, it is not anticipated that states or municipalities will adopt this type of smart infrastructure element, such that it becomes a viable and widespread technology.

Rather than placing the owners of traffic light state detection on the traffic lights themselves, and therefore on states or municipalities, it is presented herein a device and method for infrastructure element state detection and corresponding vehicle instruction, which widely distributes upon drivers the task of data collection and allows for a centralized or decentralized processing of said data.

FIG. 1 shows an intersection with an infrastructure element system. A plurality of infrastructure elements, such as traffic control lights, may be grouped together at a single intersection, such that they coordinate and only permit movement of traffic along paths of travel that do not collide. This intersection includes a traffic light for southbound traffic with a red light 1, a yellow light 2, a green light, and an arrow light 4; a traffic light for eastbound traffic with a red light 5, a yellow light 6, a green light 7, and an arrow light 8; a traffic light for northbound traffic with a red light 9, a yellow light 10, a green light 11, and an arrow light 12; and a traffic light for westbound traffic with a red light 13, a yellow light 14, a green light 15, and an arrow light 16. The intersection also includes a sensor for northbound traffic turning west 17, a sensor for westbound traffic turning south 18, a sensor for southbound traffic turning east 19, and a sensor for eastbound traffic turning north 20. Finally, the intersection includes vehicle presence sensors for vehicles on the secondary road, such as vehicles in eastbound traffic 21 and vehicles and westbound traffic 22. An infrastructure element system may employ a traffic light timing to generally control the timing of lights 1-16, as well as one or more sensors 17-22 to modify the light timing based on the presence of one or more vehicles.

Figure 2:
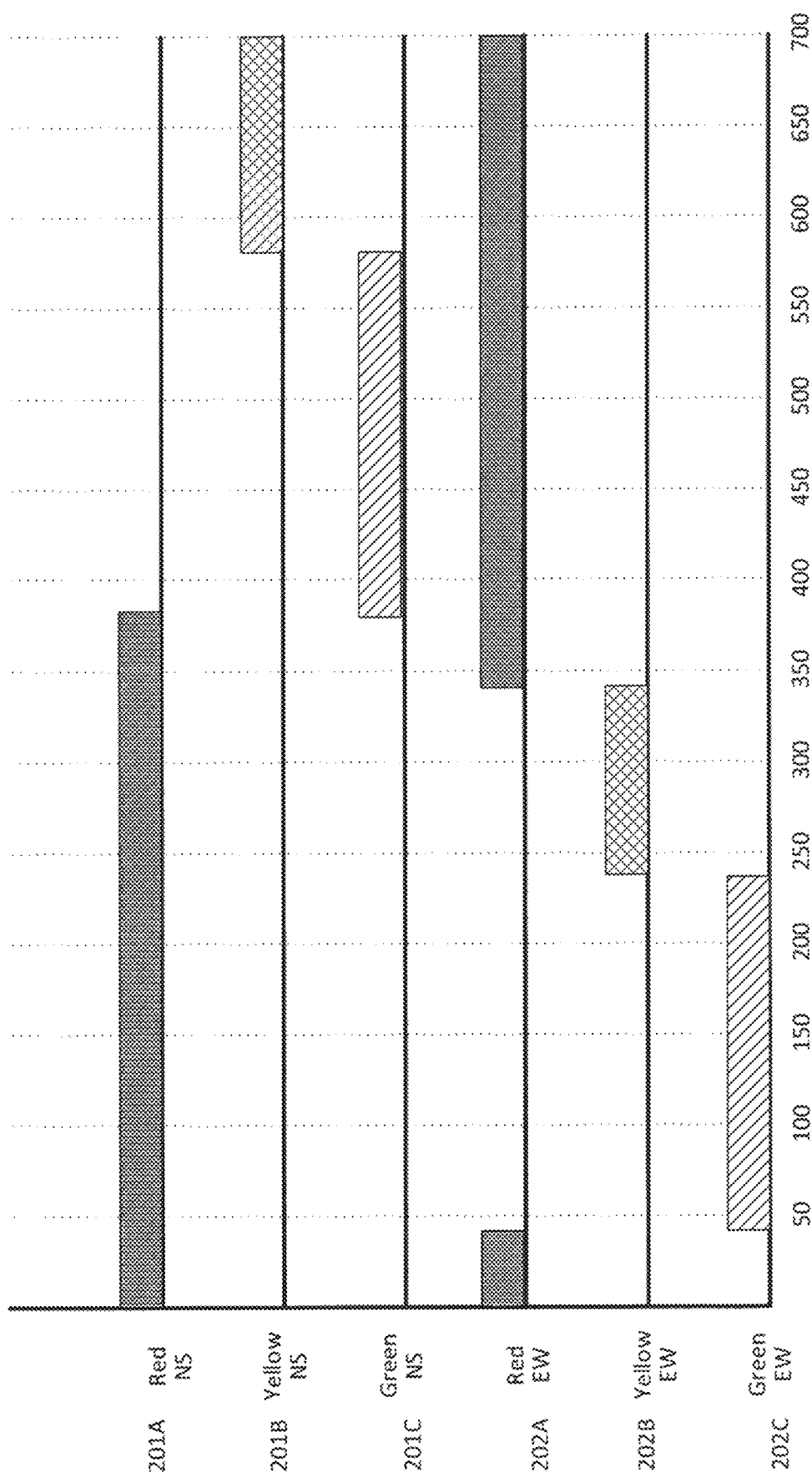
FIG. 2 shows an infrastructure element timing diagram.

FIG. 2 shows an infrastructure element timing diagram depicting the timing of an infrastructure element for northbound and southbound traffic 201A-201C and an infrastructure element for eastbound and westbound traffic 202A-202C. The infrastructure element for northbound and southbound traffic 201A-201C is depicted as beginning with a red light for 38.9 seconds 201A, followed by a green light for 20.0 seconds 201C, followed by a yellow light for 10.0 seconds 201B. The infrastructure element for eastbound and westbound traffic is depicted as beginning with an overlapping red light for 4.0 seconds 202A, follow by a green light for 20.0 seconds 202C while the infrastructure element for northbound and southbound traffic is red 201A, a yellow light for 10.0 seconds 202B while the infrastructure element for northbound and southbound traffic remains red 201A, and a red light for 31.0 seconds 202A, during which the infrastructure element for northbound and southbound traffic changes from red to green to yellow. In this manner, movement of northbound or southbound traffic is never permitted contemporaneously with movement of eastbound or westbound traffic. Moreover, the timing system permits a buffer between movement of northbound or southbound traffic and movement of eastbound or westbound traffic, as depicted by the corresponding yellow lights 201B and 202B. This diagram depicts an infrastructure element timing for the corresponding infrastructure element system. Depending on the implementation, an infrastructure element system of two or more lights may operate according to a fixed infrastructure element timing, such as, for example, the infrastructure element timing depicted in FIG. 2. Alternatively, the infrastructure element system may operate based on an infrastructure element timing which is modified or overridden by one or more sensors, such as a vehicle presence sensor or a pedestrian presence sensor.

Figure 3:
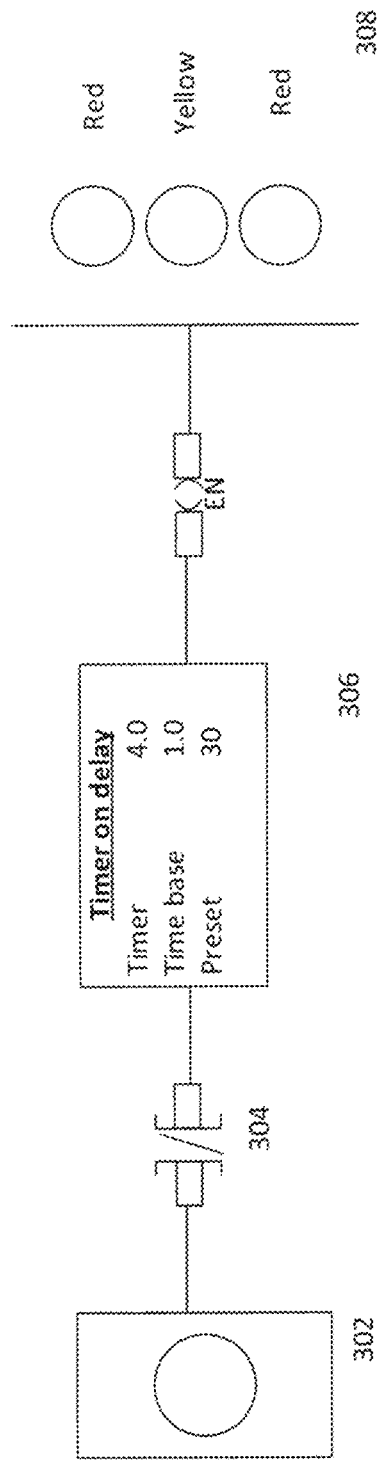
FIG. 3 depicts a modification of an infrastructure element timing based on sensor input.

FIG. 3 depicts a modification of an infrastructure element timing based on sensor input. In this case, the infrastructure element or traffic control system (including two or more associated infrastructure elements) receives input from a sensor 302. The sensor may be any kind of sensor whatsoever. Nonlimiting examples of such sensors may be a sensor to determine the presence of a vehicle, a sensor to determine the presence of a pedestrian, or a pedestrian-actuated button, such as at a crosswalk. Upon the sensor detecting the presence of a vehicle or pedestrian, or upon pedestrian-actuation of the button or switch, a signal 304 is transmitted to a processor of the infrastructure element or traffic control system. The processor is configured to implement a sensor program 306, which may include an alternative timing that may override the main infrastructure element timing. In this case, the sensor program 306 depicts a timer to implement a change in the current infrastructure element elimination, as well as a duration for effectuation of the sensor program 306. In this case, the sensor program 306 becomes activated 4 seconds after sensor activation or button/switch-actuation. The sensor program 306 is carried out for thirty seconds. Upon implementation of the sensor program 306, the corresponding infrastructure element turns to red as depicted in 308. This may operate, for example, where a pedestrian is present and actuates a button or switch to request a walk signal. Upon actuation of the button or switch, and upon after a brief pause, the lights for cross-traffic may return to red, to allow safe passage of the pedestrian. Similarly, if a sensor detects the presence of a vehicle, the sensor program may require that lights for cross-traffic become red, to allow for safe travel of the detected vehicle. It should be stated that these specific timing, chronology, and series of light changes as depicted in FIG. 2 and FIG. 3 are provided as examples only, and may be modified in duration and order without detracting from the disclosure.

Figure 4:
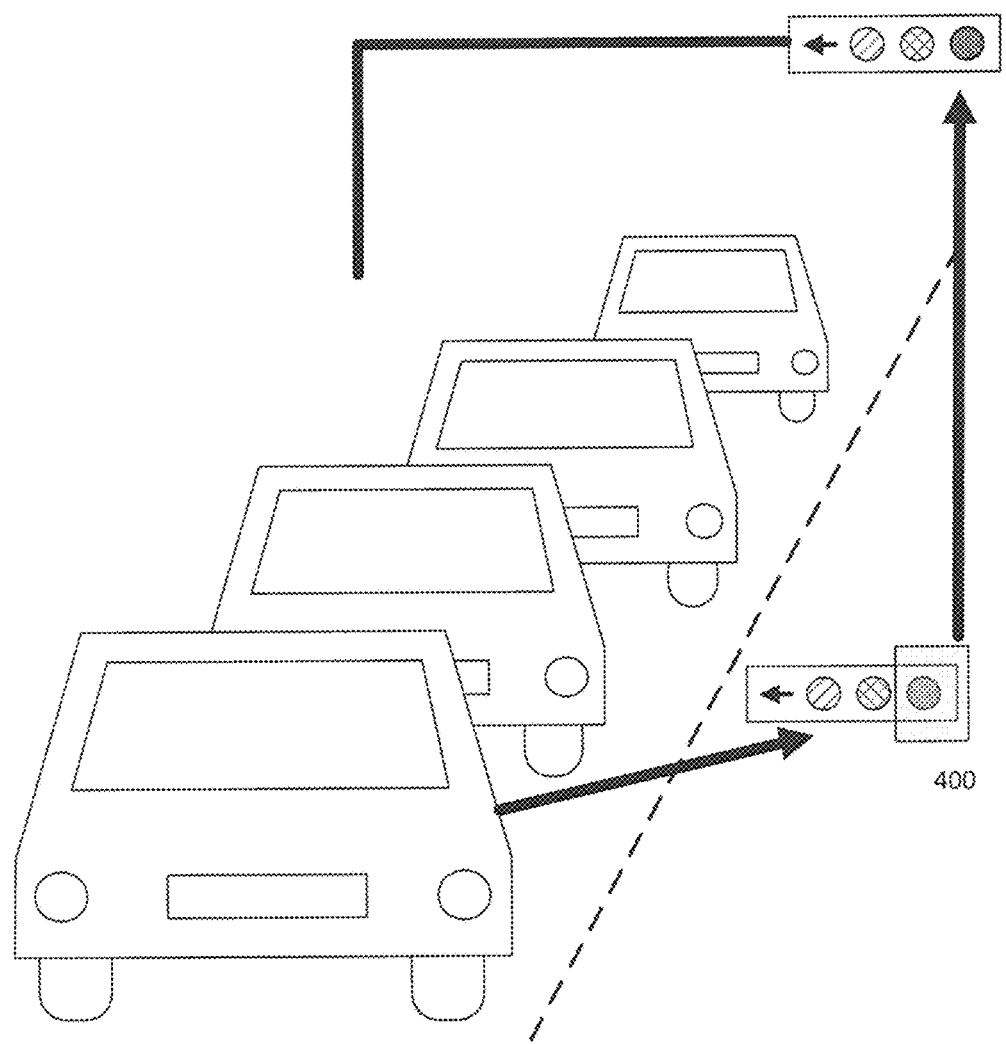
FIG. 4 depicts a plurality of vehicles stopped at an infrastructure element.

FIG. 4 depicts a plurality of vehicles stopped at an infrastructure element displaying a red light. One or more of the vehicles may be equipped with one or more image sensors, which may be configured to obtain an image of the infrastructure element. This is depicted in at least 400, which shows an image of the infrastructure element with a left-turn arrow illuminated as red. The one or more image sensors may be configured to obtain image data of a vicinity of the vehicle, said vicinity including one or more infrastructure elements corresponding to a direction of travel of the vehicle. The vehicle may be equipped with one or more processors that are configured to receive the image sensor data and identify one or more infrastructure elements (such as traffic lights) within the image data. The one or more processors may be further configured to determine an illuminated light within the identified infrastructure element, such as determining whether the infrastructure element is illuminated as red, green, or yellow. The one or more processors may be configured to determine a timing of the infrastructure element illumination, such as a duration that any one or more lights are illuminated. The vehicles may also be configured with a positioning sensor, such as a sensor configured to operate according to the Global Positioning System. The one or more processors may be configured to associate a state of the infrastructure element (such as an illuminated light within the infrastructure element), a duration of the state of the infrastructure element, and/or a position of the infrastructure element or a vehicle within a vicinity of the infrastructure element.

Figure 5:
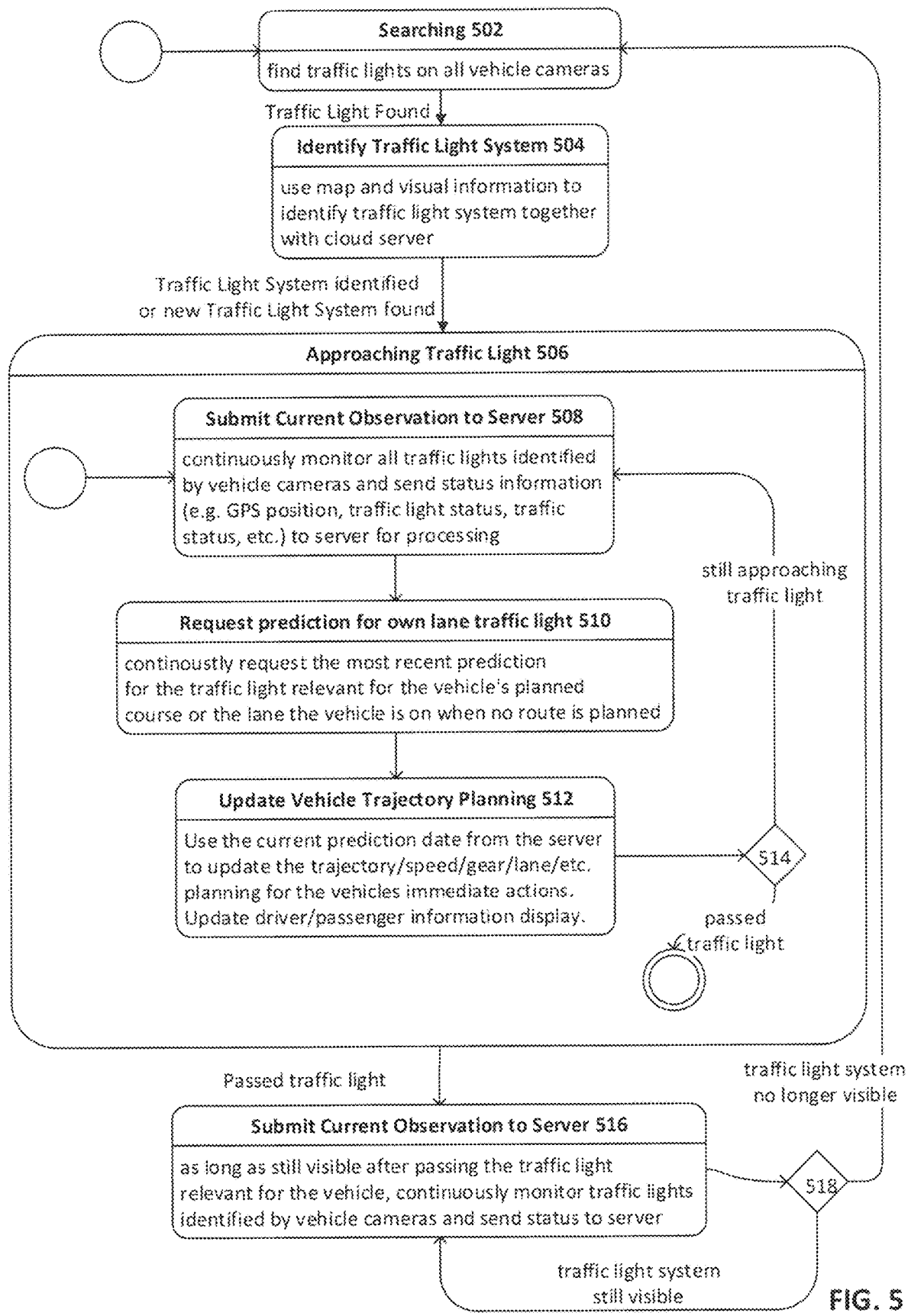
FIG. 5 depicts an operational state diagram.

FIG. 5 depicts an operational state diagram, according to an aspect of the disclosure. According to this diagram, one or more vehicle processors may be configured to implement a searching step 502, in which data from one or more vehicle image sensors is analyzed to detect any infrastructure elements. Vehicle image sensors and detected infrastructure elements corresponding to a direction of vehicle travel may be particularly important for a future action of the detecting vehicle; however, the vehicle processors may be configured to detect the presence of infrastructure elements within any direction of the vehicle, including directions that do not correspond to a direction of vehicle movement. In so doing, information corresponding to the detected infrastructure elements (infrastructure element date, location, timing, etc.) may be transmitted to a server for additional data processing. In this manner, the system may detect a logic or state of infrastructure elements corresponding to a direction of vehicle movement, as well as infrastructure elements that do not correspond to a direction of vehicle movement.

If an infrastructure element is detected within the image sensor data, the infrastructure element system is identified 504. The one or more processors implementing this step may have access to one or more data sources to identify the specific detected infrastructure element. For example, the vehicle may be equipped with a position sensor, such as for example a position sensor according to the Global Position System, and the one or more processors may correlate a detected position with a detected infrastructure element. The one or more processors may additionally or alternatively have access to map data corresponding to a vicinity of the detecting vehicle. In this manner, a distance between the detected infrastructure element and the vehicle, and/or a heading corresponding to the detected infrastructure element, may be detected using map data, and the vehicle's detected position information may be modified by the distance and/or heading to determine a location of the detected infrastructure element. Moreover, image data from the map data may be used to detect a location of the detected infrastructure element. In this manner, the image data of the infrastructure element from the one or more vehicle image sensors may be compared with image data of the infrastructure element within the map data. If the infrastructure element can be identified within the map data, the specific infrastructure element may be identified.

The server as described herein may include a memory on which is stored information corresponding to one or more known infrastructure elements. Said information may include, but is not limited to, at least one of infrastructure element identification, infrastructure element timing, associated infrastructure element sensors, timings associated with infrastructure element sensors, direction of travel associated with the infrastructure element, or timings or sensors associated with any infrastructure element within an infrastructure element system containing the detected infrastructure element.

As the detecting vehicle approaches the infrastructure elements 506, the following steps may be performed. First, any observations of the infrastructure element may be transmitted to the server 508. Any detected infrastructure elements may be continuously monitored by the one or more vehicle image sensors, and any status information pertaining to the detected infrastructure element may be transferred to the server. Such status information may include, but is not limited to, a position of the infrastructure element (whether a GPS position, a detected position using image data as described above, or otherwise), an infrastructure element status (a color of light illuminated), or a traffic status (whether traffic is moving or stopped, or a traffic quality such as heavy traffic, light traffic, or median traffic).

The detecting vehicle may request from the server a prediction for its own infrastructure element 510. The vehicle may request a most recent prediction for the infrastructure element relevant to the vehicle's direction of travel or planned course of travel. As described herein, the server may utilize known infrastructure element information, such as timings, states, distances from vehicle, or otherwise to predict an infrastructure element state for the vehicle. Upon receiving a prediction, the vehicle may update a trajectory planning 512, in which information pertaining to the vehicle's travel is modified. Such modified information may include, but is not limited to, a vehicle trajectory, a velocity, and intended gear, a lane of travel, a route, or otherwise. If the vehicle trajectory planning step 512 has been carried out, and the vehicle continues to approach or be in the vicinity of a detected infrastructure element 514, the steps 508 through 512 may be repeated. According to one aspect of the disclosure, the repetition may occur until the vehicle is no longer within a vicinity of the infrastructure element.

As stated above, this procedure may be carried out for any infrastructure elements, including those that are not relevant to the vehicle's route or direction of travel. This is described in, for example, step 516 related to submission of current observations. For example, when a vehicle passes an infrastructure element that is not relevant for the vehicle's route or direction of travel, the vehicle may continue to monitor the infrastructure element and to send information related to the monitored infrastructure element such as an infrastructure element state, timing, location, or otherwise, to the server. When the detected infrastructure element is no longer visible 518, vehicle image data may again be searched for detection of any other infrastructure elements 502.

Figure 6:
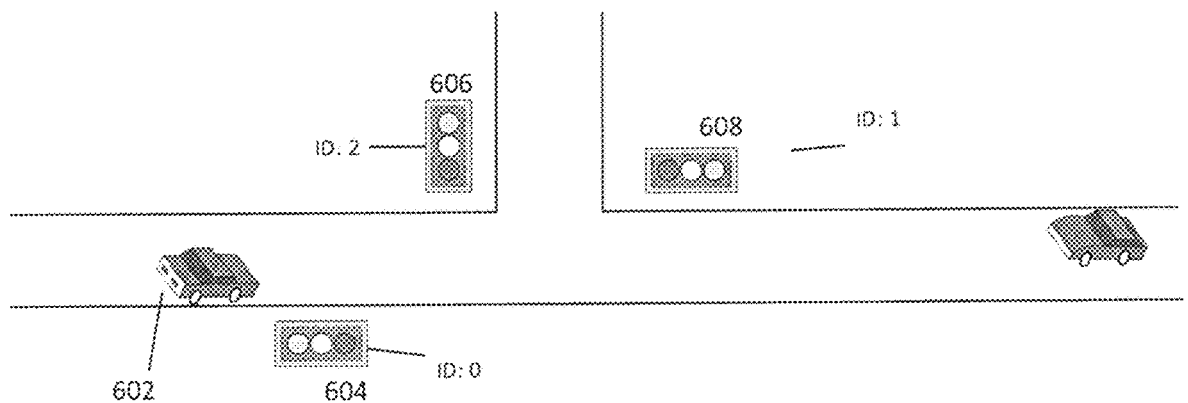
FIG. 6 depicts the receipt of infrastructure element information from one or more vehicles.

FIG. 6 depicts the receipt of infrastructure element information from one or more vehicles. Vehicle 602 is traveling eastbound, and during said travel encounters infrastructure elements 604, 606, and 608. Vehicle 602 is equipped with one or more image sensors, which are configured to obtain image data about a vicinity of the vehicle. During travel, the one or more image sensors of vehicle 602 obtain one or more images of infrastructure element 604. The images are sent to one or more processors, which detect in the images the infrastructure element 604. The one or more processors may be further configured to detect an infrastructure element state, such as whether the red light, the yellow light, or the green light is illuminated. The one or more processors may determine from a plurality of images a duration of an infrastructure element state. Otherwise stated, the one or more processors may detect a duration that a red light, a yellow light, or a green light is illuminated. This may be achieved according to any known method. One such method may be to compare a period of illumination against a timer, such that the first observed instance of illumination is noted as $t_0$, and the last observed instance of illumination is $t_1$. Another reported observed duration of illumination is the time difference between $t_0$ and $t_1$. Alternatively, a duration of illumination may be calculated based on the number of delivered images from the one or more image sensors in relationship to the corresponding frame rate. For example, if a sensor delivers image data at a frame rate of sixty images per second, and 120 consecutive images depict an illuminated red light, it may be determined that the light was illuminated for at least two seconds.

In the case of FIG. 6, it may be determined, for example, that infrastructure element 604 was observed by vehicle 602 as being in a red state for the twenty-second period in which infrastructure element 604 was visible and detectable to vehicle 602, until vehicle 602 past infrastructure element 604. Subsequently, the vehicle approached infrastructure element 606, which was observed as being red for ten seconds, and subsequently changed to yellow for one second, followed by a change to green, which was observed for at least ten seconds.

In some jurisdictions, infrastructure elements may be placed on opposite sides of a roadway that is perpendicular to the direction of traffic. Said infrastructure elements may be duplicative of one another, and thus display identical light information. These duplicative infrastructure elements may be employed so as to improve visibility for vehicles from a variety of locations. The system described herein may be configured to identify such duplicative infrastructure elements and to evaluate them according to a single timing or logic. For example, infrastructure element 604 and infrastructure element 608 are placed for traffic in an eastbound direction, such as for vehicle 602. Although these infrastructure elements are located on opposite sides of the roadway for northbound traffic, they may display duplicative information. For example, infrastructure element 608 may be placed to be primarily visible for vehicles stopped very close to the northbound roadway, and infrastructure element 604 may be placed for improved visibility for vehicles substantially westward from the roadway for northbound traffic.

Any infrastructure element observations from the vehicle image data may be time-encoded or time stamped. Associating the images with a time may permit data fusion with inputs from other enabled vehicles and their corresponding infrastructure element observations. Set observations may be made from the same lane in the same direction of traffic, or from other lanes or other directions. In combining multiple data sources from a variety of perspectives, a greater knowledge of the infrastructure element system can be obtained.

Figure 7:
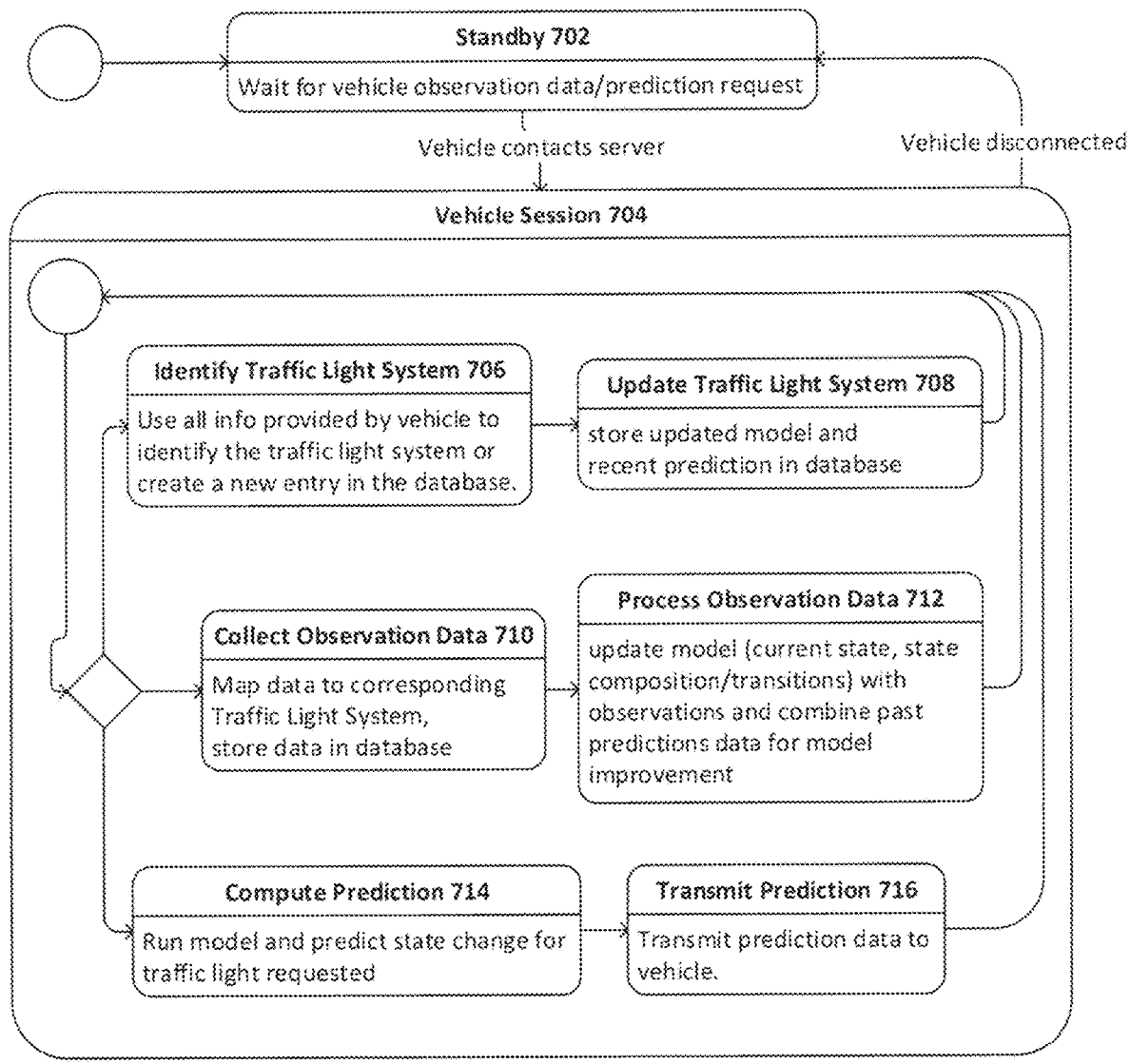
FIG. 7 displays the logical process of the server receiving image data from one or more vehicles.

FIG. 7 displays the logical process of the server receiving image data from one or more vehicles, as well as an exemplary state diagram of the cloud server processing. The number of vehicles and/or infrastructure element systems processed in parallel is unlimited.

As stated herein, the server may be connected to one or more transceivers, which are configured to receive wireless transmissions of traffic control data from one or more vehicles. The server may begin in standby mode 702, in which the server waits for vehicle observation data or vehicle prediction requests. That is, the server may wait in standby until receiving a transmission of infrastructure element data, whether vehicle-calculated determinations from vehicle image data, or vehicle image data itself. When a vehicle initiates contact with the server, a vehicle session 704 is initiated.

The vehicle session 704 may include identification of an infrastructure element system 706. Information provided from the vehicle is analyzed to identify a corresponding infrastructure element system, or if no corresponding infrastructure element system is available, to create a new entry in the database for the infrastructure element system corresponding to the received information.

The stored infrastructure element system may be updated 708. To the extent that a prediction was made with respect to infrastructure element system at issue, the prediction may be used to test, correct, or modify the stored model for the corresponding infrastructure element system. Similarly, any receive data regarding the infrastructure element system may be used to test, correct, or modify the stored model for the corresponding infrastructure element system. Any changes or modifications to the stored infrastructure element system are saved, and the model for the infrastructure element system is updated.

In the event that observational data is delivered, such as a state of an infrastructure element, a location of an infrastructure element, a timing of an infrastructure element, a sensor or sensor modality with respect to an infrastructure element, or otherwise, these data are mapped to a corresponding infrastructure element system within the stored database. Such observational data may be processed to update the model 712. Any received information, including but not limited to current state, state composition, state transitions, timings, sensors, etc., may be used to test or evaluate a stored model, and any distinctions between the received observations and the stored model may be identified to update the stored model. That is, the stored location, timing, state, or otherwise may be updated based on received data. A logic for a prediction may be updated based on the received data. Any updates to the model may be stored as an updated model.

During a vehicle session 704, an infrastructure element prediction may be created 714. The model corresponding to the infrastructure element system and/or to a specifically identified infrastructure element within the infrastructure element system may be analyzed to predict an illuminate light at a given time at a specific infrastructure element or a timing of a state change (change from illumination of one color to another color) for a specific infrastructure element. That is, the stored model for an infrastructure element may be analyzed in used to predict a state or state change. The predicted state or state change may then be transmitted to the requesting vehicle 716. The transmitted prediction is not limited to a color or state change, but may come in any form whatsoever including, but not limited to, an infrastructure element state (such as light color), a predicted change of a traffic control state, a timing for a traffic control state, a prediction about implementation of a sensor with respect to an infrastructure element, a determination of whether a pedestrian is present at an infrastructure element, a determination about whether one or more vehicles are present at an infrastructure element with respect to any direction of traffic, or a prediction of how the presence of one or more pedestrians or one or more vehicles will impact an infrastructure element state. Alternatively, the prediction may be delivered to the one or more vehicles in the form of an instruction or recommendation, such as a velocity or acceleration to carry out to minimize or avoid a wait time at an infrastructure element, a route to take to minimize or avoid wait time at an infrastructure element, or otherwise.

Figure 8:
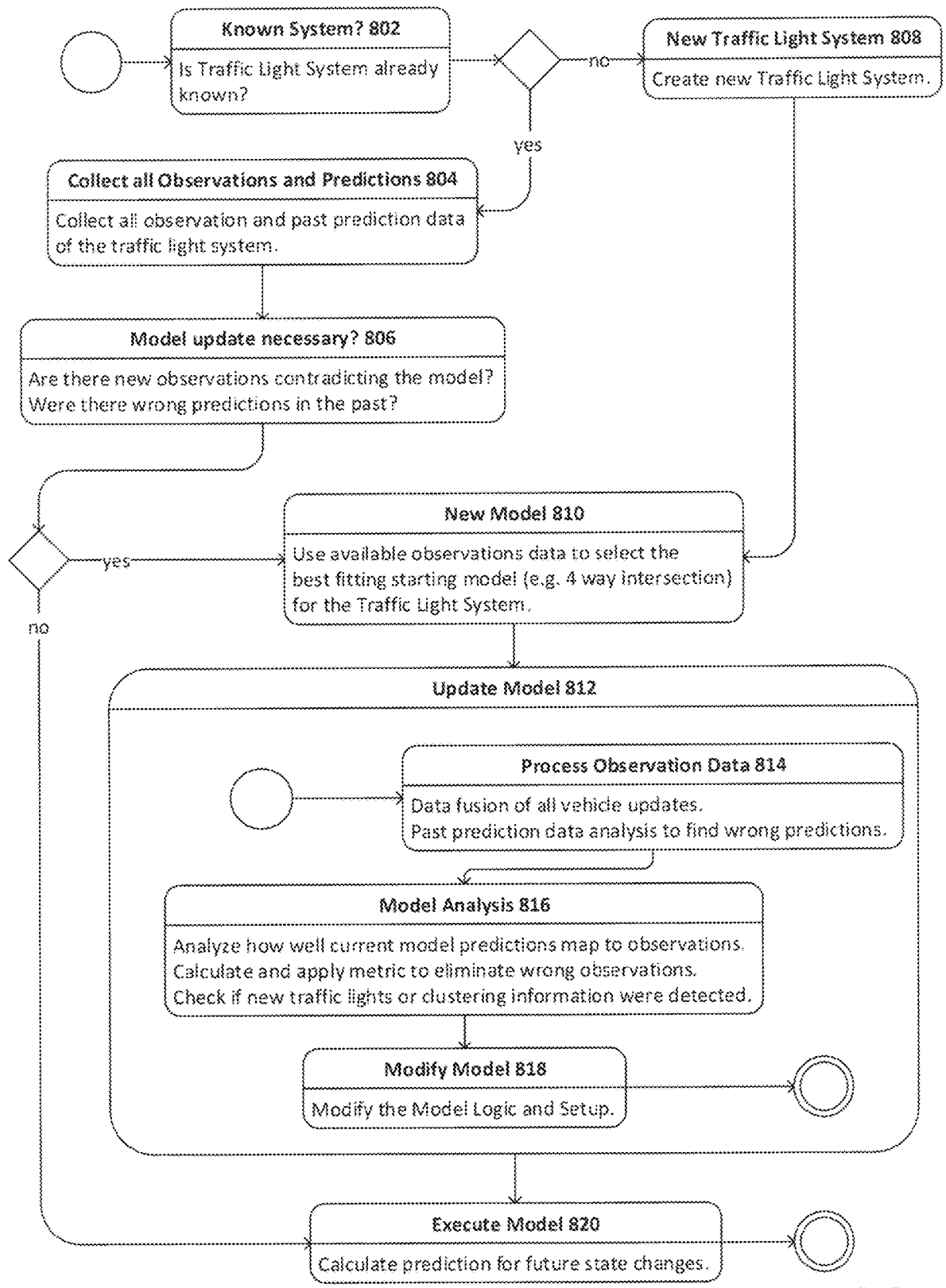
FIG. 8 depicts a procedure for creating a model and/or updating an existing model.

FIG. 8 depicts a procedure for creating a model and/or updating an existing model. When information pertaining to an infrastructure element system is received, it is first determined whether the corresponding infrastructure element system is known 802. In the event the infrastructure element system is known, a corresponding entry within the infrastructure element system database may exist. Received observational data and, if applicable, past prediction data corresponding to the infrastructure element system may be collected 804. The observations are reviewed with respect to the model, and it is determined whether any observations contradict the existing model. For example, it is determined whether the observed infrastructure element state contrasts with a corresponding predicted infrastructure element state. Other comparisons may also be made, such as whether the observed location of the infrastructure element differs from the model, whether an observed number of infrastructure elements within a traffic control system differs from the model, or otherwise. If any observations contradict the model, a model update may be performed 806.

If it is determined that the infrastructure element system is unknown, a new infrastructure element system model is created 808. The available observations may be used to select a best fitting or most appropriate starting model 810. Such starting models may include, but are not limited to, models that include at least one of a three-way intersection, a four-way intersection, a five-way intersection, intersections with turn lanes, intersections without turn lanes, intersections without right turn on red, intersections without right turn on red, intersections with pedestrian crosswalks, intersections without pedestrian crosswalks, intersections with pedestrian walk buttons, intersections without pedestrian walk buttons, or otherwise.

The model updating procedure 812 may proceed as follows. The received observational data may be processed 814. This may include any data regarding an infrastructure element within the infrastructure element system and/or any data pertaining to a relevant element of the traffic control system, such as vehicles, pedestrians, walkways, sensors, switches, etc. The data may be processed 814 in the aggregate or in smaller units. For example, all received data pertaining to an infrastructure element system may be aggregated and fused, and any observations within said data may be compared to past predictions of the corresponding infrastructure element system model to determine any incorrect predictions and thus areas requiring update. Alternatively each data set received from a vehicle may be compared to the infrastructure element system model. Upon comparing received observations to prior predictions, a model analysis 816 may be performed to determine how well the model predictions map to received observations. The comparison of the observed data to model predictions may be rated in a binary fashion such as correct or incorrect, or the comparisons may be weighted. For example, a metric may be applied to the comparison to eliminate incorrect observations. That is, a metric may be employed to account for outlying data. Such outlying data may be, for example, but not limited to, an incorrectly detected infrastructure element state, such as incorrectly determining a red light instead of a yellow light. Other potential examples may include, but are not limited to, incorrectly identifying the presence of a pedestrian, incorrectly identifying the presence of a vehicle, incorrectly identifying an infrastructure element from image data or map data, etc. As described in step 816, the metric may be applied to identify and discount outlying data that conflicts with other received data.

Based on the model analysis 816, the existing model may be modified 818. Modification of the model may include modifying the model to account for received observations of the infrastructure element or an infrastructure element system that conflict with one or more prior predictions by the model. The modifications may be made to harmonize the existing model with the observed observations. For example, in the event that the model includes a device timing of a green light for fifteen seconds, followed by red light for sixty seconds; and in the event that the received data correspond to a green light for twenty seconds, followed by a red light for fifty-five seconds, it may be assumed that the timing has been altered, and the model may be updated to include the new timing. Once the model is updated, the updated model may be used to provide data predictions for subsequently received data prediction requests 820.

Under certain circumstances, it may be necessary to update an existing model. This may occur, for example, such as when a new model is created in step 810. Said new model will be associated with little to no observational data, and incoming observational data from one or more vehicles can be used to update the selected model. In addition, when it is determined that a model update is necessary as in step 806, newly received data can be used to update an existing model.

Figure 9:
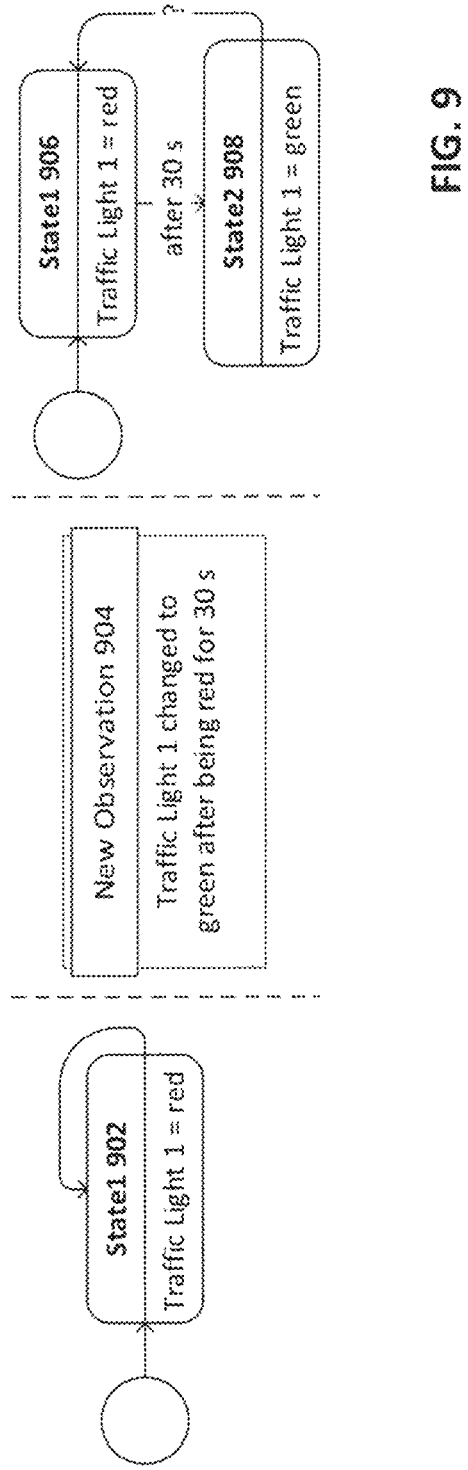
FIG. 9 shows an update of a simple infrastructure element model.

FIG. 9 shows an update of a simple infrastructure element model. In this case, the infrastructure element model is rather simplistic, including only a single state, e.g. a red light 902. Although infrastructure elements are not expected to be permanently red, this may be a reasonable early model for certain infrastructure elements, such as an infrastructure element that is red until a vehicle sensor or a pedestrian walk sensor are activated. In the course of this hypothetical infrastructure element, it may be determined to modify the infrastructure element to periodically turn from red to green without a sensor input. A vehicle in a vicinity of the infrastructure element makes and delivers to the system a new observation 904, stating that the infrastructure element was red for thirty seconds and then changed to green. This data may be compared with the single-state model, and it may be easily determined that the observational data of changing from red to green conflicts with a single state of perpetually being red. Based on this conflict, the model is updated to include a second state, wherein the light is green. As such, the new model reflects a first date 906, in which the infrastructure element is red, and a second state 908, in which the infrastructure element is green.

Figure 10:
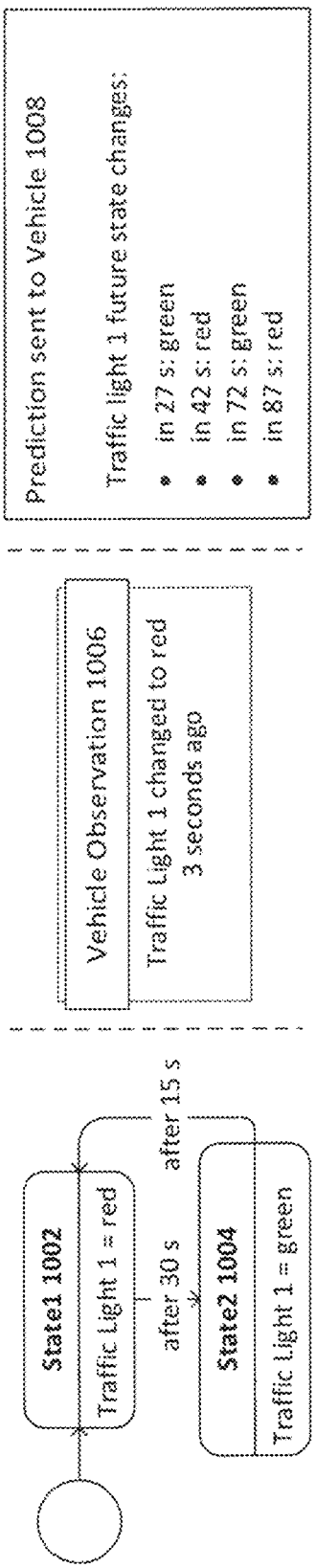
FIG. 10 depicts a receipt of vehicle observation and prediction based on existing model and vehicle observation.

FIG. 10 depicts a receipt of vehicle observation and prediction based on existing model and vehicle observation. In this example, the infrastructure element model contains two states: a first state 1002 corresponds to a red infrastructure element, which lasts for thirty seconds; and the second state 1004 corresponds to a green infrastructure element, which lasts for fifteen seconds. As depicted in this figure, the cycle of state one 1002 and state two 1004 are configured to repeat indefinitely. A vehicle in a vicinity of the infrastructure element makes and transmits a vehicle observation of the device 1006. The observation indicates that the infrastructure element changed states from green to red three seconds ago. This information is transmitted to the central database which performs a calculation in predictions, said predictions then being transmitted to the vehicle 1008. The subsequent predictions include a state change from red to green in twenty-seven seconds, a subsequent state change from green to red in forty-two seconds, a subsequent state change from red to green in seventy-two seconds, and a state change from green to red in eighty-seven seconds.

Figure 11:
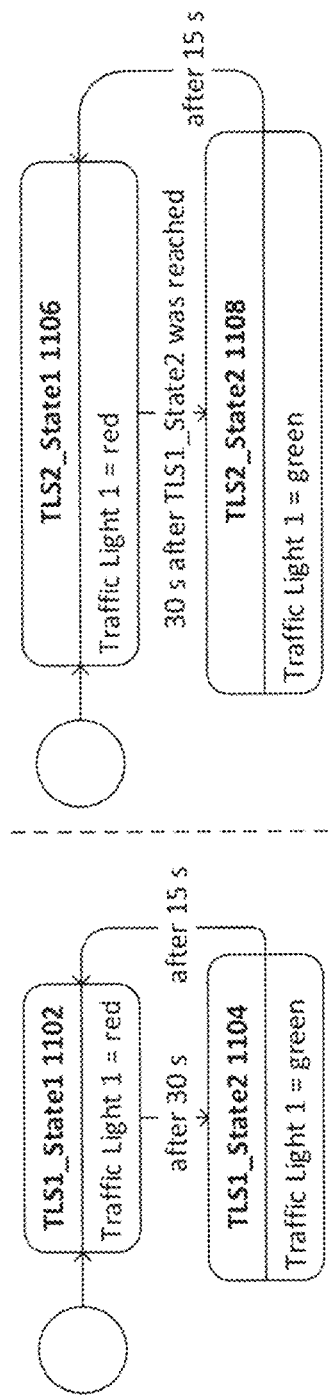
FIG. 11 depicts a relationship between infrastructure elements of two infrastructure element systems.

FIG. 11 depicts a relationship between infrastructure elements of two infrastructure element systems. In this figure, a model of a first infrastructure element of infrastructure element system one (TLS1) is shown next to a model of a second infrastructure element of infrastructure element system to (TLS2). The first infrastructure element contains a first state 1102, which corresponds to a red light lasting thirty seconds, and a second state 1104, which corresponds to a green light lasting fifteen seconds. The second infrastructure element contains a first state 1106, which corresponds to a red light, and a second state 1108, corresponding to a green light lasting fifteen seconds. In this example, the first state of the second infrastructure element 1106 is configured to change from red to green thirty seconds after the first infrastructure element reaches its state two 1104. In this manner, the second infrastructure element system is linked to the first infrastructure element system. Such systems may be designed to create a desired traffic control condition for drivers proceeding from the first infrastructure element system to the second infrastructure element system. For example, because the second infrastructure element system is configured to turn green thirty seconds after the first infrastructure element system turns green, and assuming an approximately thirty-second travel time between the first infrastructure element system and the second infrastructure element system, a vehicle traveling from the first infrastructure element system to the second infrastructure element system may generally be expected to encounter a green light at the second infrastructure element. Alternative configurations may include a timing such that the vehicle is expected to encounter a red light at the second infrastructure element system. Further stating, and depending on the particular timing of the second infrastructure element relative to the first infrastructure element, and ability of a driver traveling from the first infrastructure element to the second infrastructure element to encounter a green light may depend on the driver's velocity, acceleration, and/or a traffic pattern. A prediction of a state or future state of the second infrastructure element may include an instruction for the vehicle to travel at a particular velocity, with a particular acceleration, or with respect to a particular traffic pattern (such as a lane, a route, or otherwise) to arrive at the second infrastructure element with a green light.

Figure 12:
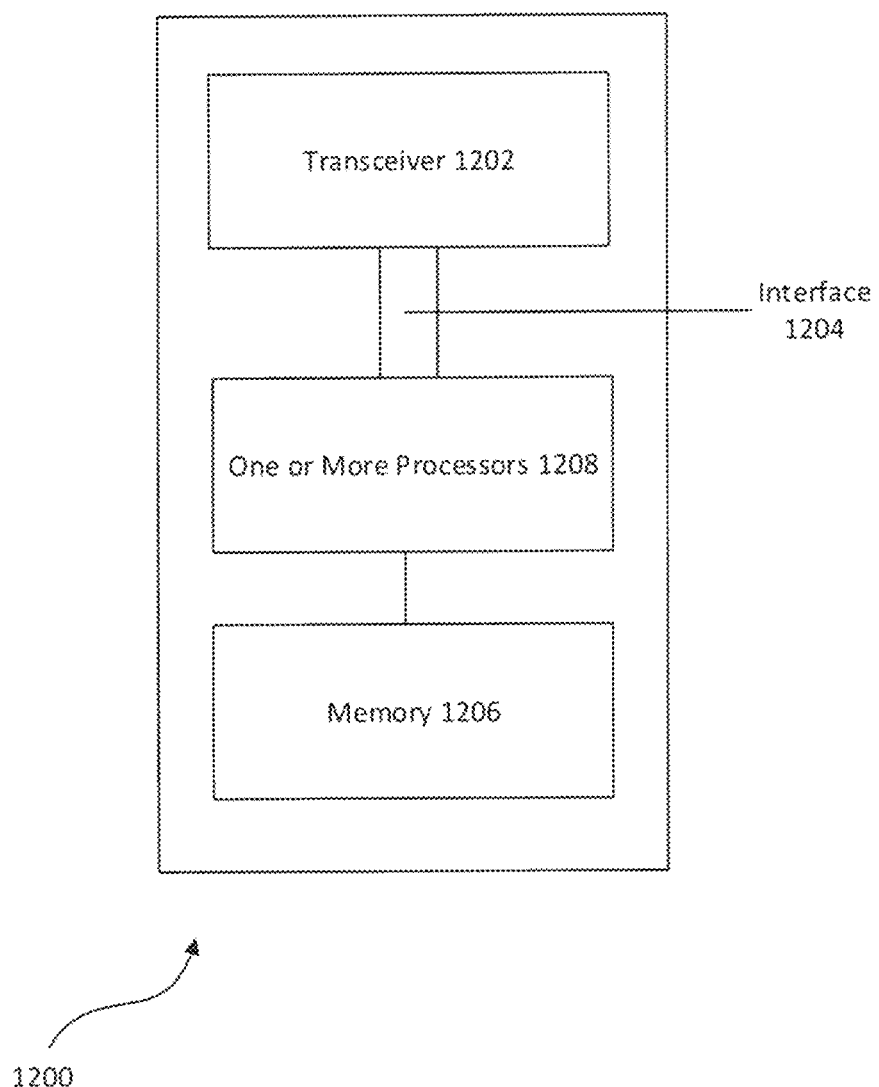
FIG. 12 depicts an infrastructure state prediction device.

FIG. 12 depicts a traffic data device 1200 including a transceiver 1202, configured to wirelessly receive traffic control observation data and to wirelessly transmit traffic control prediction information; an interface 1204, configured to transfer the traffic control observation data from the transceiver to one or more processors, and to transfer the traffic control prediction information from the one or more processors to the transceiver; a memory 1206, configured to store a data model of an infrastructure element; and the one or more processors 1208, configured to determine the traffic control prediction information based on the received traffic control observation data and the stored data model, and to control the transceiver to transmit the traffic control prediction information.

Figure 13:
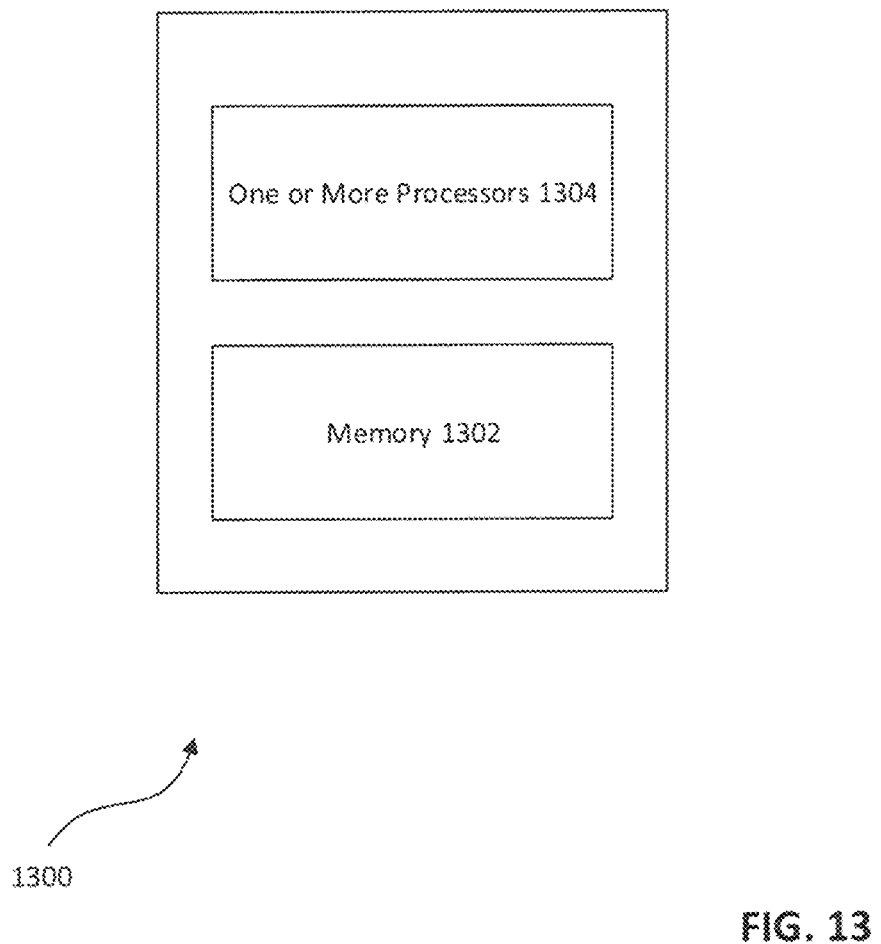
FIG. 13 depicts an infrastructure state prediction device.

FIG. 13 depicts an infrastructure state prediction device 1300 including a memory device 1302 onto which an infrastructure state model corresponding to a location and a state timing of a plurality of infrastructure elements is stored; one or more processors 1302, communicatively coupled to the memory device and configured to receive measurement information representing a location and an observed state of a first infrastructure element; determine a predicted state of a second infrastructure element based on a state timing corresponding to a second infrastructure element; determine a movement information based on the observed state of the first infrastructure element, the predicted state of the second infrastructure element and a relation between the location of the first infrastructure element and a location of the second infrastructure element; and generate a message including the movement information.

Figure 14:
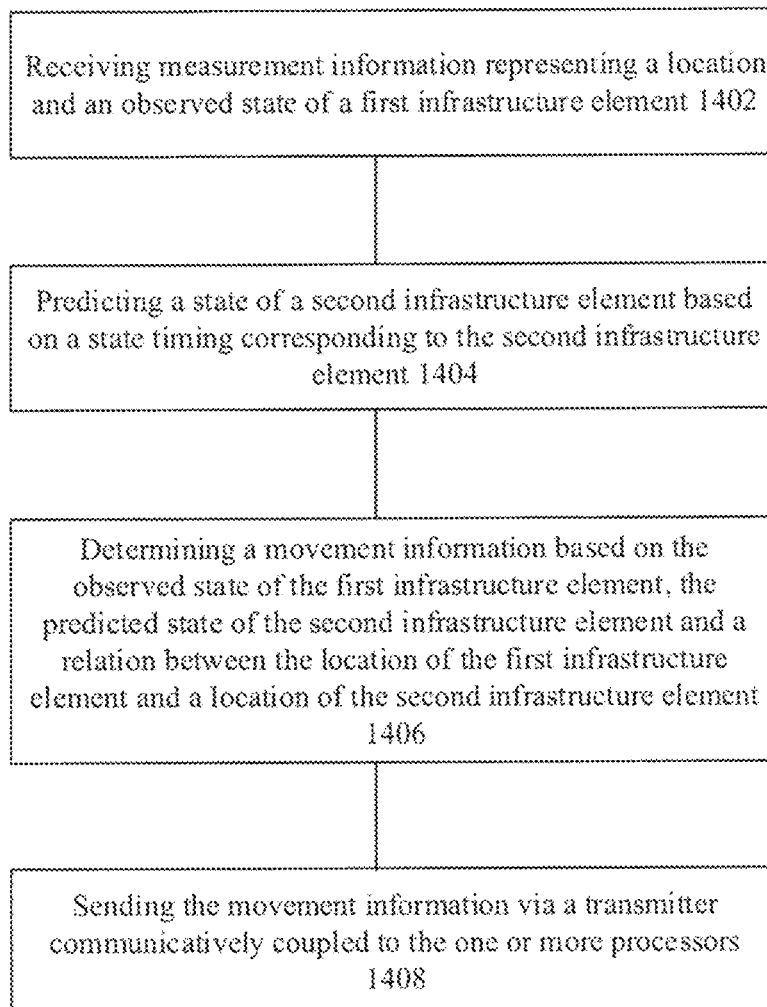
FIG. 14 depicts an infrastructure state prediction method.

FIG. 14 depicts an infrastructure state prediction method including receiving measurement information representing a location and an observed state of a first infrastructure element 1402; predicting a state of a second infrastructure element based on a state timing corresponding to the second infrastructure element 1404; determining a movement information based on the observed state of the first infrastructure element, the predicted state of the second infrastructure element and a relation between the location of the first infrastructure element and a location of the second infrastructure element 1406; and sending the movement information via a transmitter communicatively coupled to the one or more processors 1408.

According to one aspect of the disclosure, the infrastructure elements or infrastructure element systems may be identified based on estimated positions of the infrastructure element or infrastructure element systems. In this manner, the vehicle may obtain position information of the vehicle. This may commonly occur via a GPS or other global positioning system; however, position information may be obtained through any system whatsoever, without limitation, including, but not limited to, the Global Positioning System, GLONASS, Galileo, the Beidou Navigation System, the Indian Regional Navigation Satellite System, or according to any position calculation method for one or more wireless radio access technologies.

Factors related to the position of the infrastructure element may be derived from the vehicle's image data, such as a distance of the infrastructure element relative to the vehicle, a direction of the infrastructure element relative to a vehicle, or a relationship of the infrastructure element relative to one or more identified objects. Using this information, a location of the infrastructure element may be obtained. Additionally or alternatively, position information of the vehicle may be compared to map data. In this manner, map information of a general vicinity of the vehicle may be obtained based on the vehicle's position information. The received image sensor data may be compared to the map data to identify common features, such as an infrastructure element. The exact position of the infrastructure element may be available within the map data, or other identifying information may be derivable from the map data, such as an intersection where the infrastructure element is located, a direction of traffic corresponding to the infrastructure element, or otherwise.

When the positional data is known, and given navigational data about the intersection, along with image sensor data, infrastructure elements can be mapped to their positions with relatively good certainty. The fact that the infrastructure elements are always at the same relative positions to each other makes this identification process more robust.

According to one aspect of the disclosure, the server may estimate a velocity or acceleration of a vehicle to travel in order to reduce or eliminate wait time at a next infrastructure element, and report said velocity or acceleration to the vehicle. At its most basic measure, this may be achieved using any permutation of:

$$s = v_i t + \tfrac{1}{2} a t^2 \quad (1)$$

wherein s is a distance to a next infrastructure element, v is an average velocity to travel, t is a time until a change of an infrastructure element state (such as a change from red to green, or from green to red), and a is acceleration of the vehicle.

According to one aspect of the disclosure, each infrastructure element may have a unique infrastructure element identification (ID). This ID may be used by any vehicle from any position. The ID may be communicated to a requesting vehicle based on any identifying information, such as, but not limited to, location or position of the infrastructure element, a street or intersection corresponding to a location of the infrastructure element, a position of the infrastructure element relative to a known object or infrastructure element, or otherwise. The ID may be available via one or more maps.

To simplify the stored logic, it may be detected over time that, for a given intersection, some infrastructure elements behave similarly or identically. In such a situation, a pointer or reference from one or more corresponding infrastructure elements to the real logic may be stored. This may be particularly relevant in some jurisdictions, such as, for example, in the United States, where duplicative infrastructure elements are often mirrored from before the lane crossing and after it. Moreover, distinguishing the shapes included in infrastructure elements, such as arrows, or the absence of arrows, can be used to support the clustering of the duplicated indicators. In this manner, duplicative infrastructure elements can be recognized and associated.

The server may collect, store and/or process any delivered observation data. Observation data may include, but is not limited to: infrastructure element positions or relations relative to one another; infrastructure element clustering information (such as multiple infrastructure elements having the same state or otherwise being duplicative); lane information (e.g. map data), lane type (e.g. lane direction, number of lanes, whether multiple-lanes or single lanes, whether a cyclist lane is present, whether a bus lane is present, whether a taxi lane is present, whether a ride share lane is present, etc.), a crossing type (such as a pedestrian crossing, tram crossing, level crossing, etc.); a time, a day of week, whether it is a work day or weekend, school day or holiday; traffic flow observations and traffic information from map services; or whether there are approaching vehicles/pedestrians/cyclists/busses/trams/etc. in other lanes/at other infrastructure elements/on nearby railways/etc. Based on the observation information, a model is built that allows input of a current observation, determination of state of the infrastructure element system, and a prediction of future state changes based on the model created and the state derived.

The process of deriving and updating a model for a given infrastructure element is not necessarily complete at any time, except for very simple infrastructure element systems, e.g. a pedestrian crossing infrastructure element system. That is, the model can be extended and changed based on new observations all the time. A check to eliminate wrong observations (e.g. error in infrastructure element mapping, bulb of infrastructure element broken or intermittent image processing issues) may be paramount. Advanced sources of observation data can, for example, also include data such as train/tram schedules, bus schedules, holiday calendars or weather data. To receive a meaningful benefit from the model, it is not necessary to have a "complete model" that exactly represents the infrastructure element logic programming done by the manufacturer of the infrastructure element system.

Even where a prediction model is not complete, a significant advantage is received when the model can correctly predict situations like "when the pedestrian infrastructure element on the right changes to green, the lanes in front of the vehicle receive a green light 3 seconds later". Even when a model is available, another interesting task is to derive the state of the model from the observation data available at the time. Especially when only one vehicle is currently approaching the infrastructure element system, the observation data available might be too limited to exactly derive the state immediately. But here, the state estimation can be improved over time, and ambiguities in state estimation should be even less when more than one vehicle is observing the infrastructure element system. When thinking about an individual infrastructure element system, it can be that for traffic flow optimization, actually the state of multiple, nearby infrastructure element systems interact and depend on each other. This can be the case, for example, in grid-based infrastructure element control (i.e. when light corresponding to all horizontal, then all corresponding to all perpendicular vertical streets turn green at the same time) or in larger systems optimized for a given average speed. Vehicles using a server as described herein may receive a benefit for their role as providers of observational data by receiving prediction data for infrastructure element state changes. This information can be used, in general, to optimize fuel/energy efficiency, to increase ride comfort, to decrease total start-to-destination time needed, and generally to improve general traffic flow for all participants. These benefits can be achieved by the vehicle using the prediction data to plan the following actions: trajectory updates/lane changes (e.g. changing to a different lane to avoid braking behind a group of vehicles stopped at a red light when prediction data indicated a change to green happening soon, and that both lanes have the same direction and state change); a speed update (such as coasting, or traveling faster or slower toward a red light to arrive when a green light is imminent, in order to reduce or avoid stopping, or in the case or coasting or slowing, to avoid unnecessary acceleration); gear selection (choosing the right gear for either acceleration to pass through a green light that will soon change or changing to high gear for energy efficient coasting. On modern vehicles, also a neutral setting for coasting is possible); route updates (such as when there is significant traffic, when a route in the presence of traffic is likely to lead to delays based on limited priority or anticipated difficulty in turning or merging). The vehicles could also use the server for navigational route planning. This way, waiting at infrastructure elements along an optimized route can be minimized.

According to one aspect of the disclosure, one or more vehicle image sensors may be used to recover a state and/or logic of an infrastructure element system. Many modern vehicles are equipped with one or more image sensors, which, in many cases, provide a 360° view around the vehicle. In many cases, said images of a vicinity of the vehicle are already obtained for other vehicle purposes, and these images may be used and assessed for infrastructure element data without the need to obtain additional image data. The traffic control analysis as described herein may be implemented whenever a vehicle approaches a known infrastructure element, or whenever a known or unknown infrastructure element is detected in image sensor data. According to one aspect of the disclosure, all image data from the one or more vehicle image sensors is analyzed to detect the presence of an infrastructure element. If an infrastructure element is detected, the image data is further assessed to detect a state of the infrastructure element, such as a color of light that is illuminated. This information may be transmitted, with or without additional information such as location and timing, to a server. The server may be configured to obtain such data from one or more vehicles, thereby creating a distributed system.

The server as described herein may be referred to as at least a traffic data device.

The server may be configured to determine whether an infrastructure element operates according to an actuator control mode, such as where an infrastructure element deviates from a predetermined timing based on sensor detection of the presence of a vehicle or pedestrian, or changing of a switch state due to pedestrian switch activation. The operation according to an actuator control mode may be detected where a regular infrastructure element timing is known, and where a deviation from this timing is detected. A determination of an operation according to an actuator control mode may be bolstered by the detection of a corresponding switch or sensor, such as a pedestrian crossing button, or the presence of a pedestrian, as determined from the received image data. That is, where a pedestrian or a pedestrian button is detected, and a deviation of a regular timing indicates operation according to an actuator mode, the likelihood of an actuator mode may be deemed greater than if no pedestrian or pedestrian button is detected.

In the event that an actuator control mode is detected or suspected, a timing for an actuator control mode may be detected and stored within the data model. In this manner, the data model corresponding to a traffic control detection device or traffic control detection device system may include both a regular timing model and an actuator model. The infrastructure element may be assumed to operate according to the timing model until observational data indicates the presence of a pedestrian, the presence of a vehicle where a corresponding sensor is located, or the actual pedestrian actuation of a crossing switch, at which time it may be assumed that the actuator model will be invoked. Similarly, where there is a detected deviation in light illumination as compared to the regular timing model, it may be assumed that the actuator model has been invoked. As described above, the actuator model may be associated with a particular timing, such as a delay following execution of the actuator model, followed by a change in light illumination to permit pedestrian crossing or travel of one or more vehicles associated with a triggered sensor. It may be assumed that the actuator model will follow through until completion, at which time the timing model will resume.

Although the examples described herein have principally referred to a server as receiving and distributing information, the principles and methods described herein may also be carried out in a decentralized fashion. In this manner, rather than vehicles transmitting observation data to a centralized server, the server making any necessary calculations, and the server transmitting a traffic control prediction to one or more vehicles, the calculations may be performed in a distributed manner across a plurality of vehicles. According to the distributed model, vehicles may be equipped with an ability to communicate with one another, whether according to a vehicle-to-vehicle (V2V) protocol or otherwise. Vehicles may obtain image data in the manner described above and then transmit the corresponding traffic control observational data to one or more other vehicles, rather than to a centralized server. The one or more other vehicles may be configured to receive the observational data and process set observational data to derive traffic control prediction information based on a data model. The data model may be a stored data model corresponding to the relevant infrastructure element, or the data model may be derived from observational data, such as observational data received from the one or more vehicles and observational data detected by the receiving vehicle. The vehicles may be configured to transmit their data models to one another. As vehicles travel in a direction, a plurality of vehicles may be configured to coordinate their observational data and to build data models and predict traffic timing accordingly. The exchange of data may occur in a cluster of vehicles traveling in a given direction. The exchange of information may occur in a series or chain-wise system, in which vehicles successively traveling in the same or similar direction may exchange data with one another. In this manner, a vehicle may receive the benefit of a plurality, and even potentially a very large number of, preceding vehicles.

The observational data may be processed according to one or more of a plurality of processing degrees. That is, the one or more vehicles may transmit as observational data raw image data received from the one or more sensors, or the one or more vehicles may perform an amount of preprocessing before transmission. In preprocessing, the one or more vehicles may be configured to analyze said image data to detect the presence of an infrastructure element, an infrastructure element system, an intersection, a sensor, a pedestrian walkway, a pedestrian switch, or any of the other traffic-related features as described herein. Upon detecting said feature, the one or more vehicles may be configured to transmit an indicator of the detected feature, rather than transmitting the corresponding image data. The indicator may be configured according to any system whatsoever, without limitation. According to one aspect of the disclosure, the indicator may be one or more bits, encoded to reflect the presence of a detected feature and/or one or more bits configured to coordinate a detected feature to a specific infrastructure element.

It is expressly noted that, where a timer is present, it is not necessary to observe until the end of the time for the observed information to be incorporated into the traffic control device schema and learned from. Many jurisdictions utilize a countdown timer to indicate a remaining time until a light changes. This may be, for example, at a traffic light, which displays a length of time until the light changes from red to green, or at a pedestrian light, which displays a length of time until the light changes from "don't walk" to "walk." An infrastructure state prediction device can be configured to observe and learn from any portion of such a timer, whether said portion includes a beginning of the timed period, the end of the timed period, or neither the beginning nor the end. As an example, in the event that a pedestrian timer is encountered, and the measuring vehicle receives a green light with fifteen seconds remaining on the timer, it is known that the pedestrian light will change in fifteen seconds, even if the vehicle does not observe the changing light. The system described herein may log a change of the pedestrian light in fifteen seconds, as if the vehicle had made this observation. Such anticipatory changes may be logged in any infrastructure displaying a countdown timer, even in circumstances where the end of the timer is not observed.

The following examples pertain to various aspects of the Disclosure:

In Example 1, an infrastructure state prediction device is disclosed including: a memory device onto which an infrastructure state model corresponding to a location and a state timing of a plurality of infrastructure elements is stored; one or more processors, communicatively coupled to the memory device and configured to receive measurement information representing a location and an observed state of a first infrastructure element; determine a predicted state of a second infrastructure element based on a state timing corresponding to a second infrastructure element; determine a movement information based on the observed state of the first infrastructure element, the predicted state of the second infrastructure element and a relation between the location of the first infrastructure element and a location of the second infrastructure element; and generate a message including the movement information.

In Example 2, the infrastructure state prediction device of Claim 1 is disclosed, wherein the infrastructure state model further includes an identifier for each infrastructure element, and wherein the predicted state of the second infrastructure element is further determined using an infrastructure element identifier.

In Example 3, the infrastructure state prediction device of Claim 1 or 2 is disclosed, wherein the movement information includes at least one of a vehicle velocity instruction, a vehicle acceleration instruction, a vehicle timing instruction, a route instruction, or a timing of the predicted state of the second infrastructure element.

In Example 4, the infrastructure state prediction device of Claim 3 is disclosed, wherein the predicted state is an illumination of a red, a yellow, or a green light.

In Example 5, the infrastructure state prediction device of Claim 3 is disclosed, wherein the predicted state is a timing of a change from illuminating a light of a first color to illuminating a light of a second color.

In Example 6, the infrastructure state prediction device of Claim 3 is disclosed, wherein the predicted state is a timing of a change in illumination from any one of a red, yellow, or green light, to any other of the red, yellow, or green light.

In Example 7, the infrastructure state prediction device of any one of Claims 1 to 6 is disclosed, wherein the measurement information includes a location and an observed state of a first infrastructure element.

In Example 8, the infrastructure state prediction device of Claim 7 is disclosed, wherein the measurement information corresponds to an observed illumination of a red, a yellow, or a green light.

In Example 9, the infrastructure state prediction device of any one of Claims 1 to 6 is disclosed, wherein the measurement information includes image data corresponding to at least one of a location and an observed state of a first infrastructure element.

In Example 10, the infrastructure state prediction device of any one of Claims 1 to 9 is disclosed, wherein the measurement information further corresponds to at least one of a presence of a vehicle in a vicinity of the infrastructure element, a number of vehicles in a vicinity of the infrastructure element, a direction of travel of one or more vehicles in a vicinity of the infrastructure element, a presence of a pedestrian in a vicinity of the infrastructure element, a number of pedestrians in a vicinity of the infrastructure element, a direction of travel of one or more pedestrians in a vicinity of the infrastructure element, or any combination thereof.

In Example 11, the infrastructure state prediction device of any one of Claims 1 to 10 is disclosed, wherein the infrastructure state model further includes a plurality of state timings of an infrastructure element.

In Example 12, the infrastructure state prediction device of any one of Claims 1 to 11 is disclosed, wherein a plurality of infrastructure elements are associated as a traffic control system.

In Example 13, the infrastructure state prediction device of Claim 12 is disclosed, wherein a state timing of a first infrastructure element in the traffic control system is dependent on a state timing of a second infrastructure element in the traffic control system.

In Example 14, the infrastructure state prediction device of any one of Claims 1 to 13 is disclosed, wherein the one or more processors are further configured to compare the received measurement information to the state timing of a corresponding infrastructure element, and if the received measurement information conflicts with corresponding state timing, to modify the state model.

In Example 15, the infrastructure state prediction device of any one of Claims 1 to 13 is disclosed, wherein the one or more processors are further configured to compare the received measurement information to the state timing of a corresponding infrastructure element, and if the received measurement information conflicts with corresponding state timing, to modify the state timing.

In Example 16, the infrastructure state prediction device of any one of Claims 1 to 13 is disclosed, wherein the one or more processors are further configured to compare the received measurement information to the state timing of a corresponding infrastructure element, and if the received measurement information conflicts with corresponding state timing, to estimate a reliability of the received measurement information.

In Example 17, the infrastructure state prediction device of Claim 16 is disclosed, wherein the one or more processors are further configured to elect to modify or not to modify the state timing to correspond to the received measurement information based on the estimated reliability of the received measurement information.

In Example 18, the infrastructure state prediction device of any one of Claims 1 to 17 is disclosed, wherein the state timing includes a timing of one or more light illumination phases of the infrastructure element.

In Example 19, the infrastructure state prediction device of any one of Claims 1 to 18 is disclosed, wherein the one or more processors are further configured to determine from the received measurement data whether an infrastructure element operates according to an actuator control mode, and if the one or more processors determine that the infrastructure element operates according to an actuator control mode, to determine a state timing of the actuator control mode.

In Example 20, the infrastructure state prediction device of Claim 19 is disclosed, wherein the one or more processors are configured to determine whether an infrastructure element operates according to an actuator control mode based on received measurement data corresponding to a pedestrian switch.

In Example 21, the infrastructure state prediction device of Claim 19 is disclosed, wherein the one or more processors are configured to determine whether an infrastructure element operates according to an actuator control mode based on received measurement data corresponding to a presence of a pedestrian.

In Example 22, the infrastructure state prediction device of Claim 19 is disclosed, wherein the one or more processors are configured to determine whether an infrastructure element operates according to an actuator control mode based on received measurement data that conflicts with the corresponding state timing.

In Example 23, the infrastructure state prediction device of any one of Claims 19 to 22 is disclosed, wherein the actuator control mode is a state timing for the infrastructure element, and wherein the actuator control mode is executed upon sensor detection of a vehicle or pedestrian.

In Example 24, the infrastructure state prediction device of any one of Claims 19 to 22 is disclosed, wherein the actuator control mode is a state timing for the infrastructure element, and wherein the actuator control mode is executed upon actuation of a switch.

In Example 25, the infrastructure state prediction device of any one of Claims 1 to 24 is disclosed, wherein the movement information includes the prediction of an infrastructure element state.

In Example 26, the infrastructure state prediction device of any one of Claims 1 to 25 is disclosed, wherein the movement information includes a vehicle instruction based on the prediction of an infrastructure element state.

In Example 27, the infrastructure state prediction device of any one of Claims 1 to 26 is disclosed, wherein one or more processors are further configured to determine the movement information according to one or more of a plurality of operational modes.

In Example 28, the infrastructure state prediction device of Claim 27 is disclosed, wherein the plurality of operational modes include at least one of a fuel conservation mode, a battery conservation mode, a stopping reduction mode, or a braking reduction mode.

In Example 29, the infrastructure state prediction device of any one of Claims 1 to 28 is disclosed, wherein the transceiver is configured to transmit and receive according to an Internet of Things technology.

In Example 30, the infrastructure state prediction device of any one of Claims 1 to 28 is disclosed, wherein the transceiver is configured to transmit and receive on a 5G Radio Access Technology.

In Example 31, the infrastructure state prediction device of any one of Claims 1 to 30 is disclosed, wherein the infrastructure state model is a conceptual infrastructure state model.

In Example 32, the infrastructure state prediction device of any one of Claims 1 to 30 is disclosed, wherein the infrastructure state model is a logical infrastructure state model.

In Example 33, the infrastructure state prediction device of any one of Claims 1 to 30 is disclosed, wherein the infrastructure state model is a physical infrastructure state model.

In Example 34, the infrastructure state prediction device of any one of Claims 1 to 33 is disclosed, wherein the infrastructure state prediction device is configured as a cloud server.

In Example 35, an infrastructure state prediction method is disclosed including: receiving measurement information representing a location and an observed state of a first infrastructure element; determining a predicted state of a second infrastructure element based on a state timing corresponding to the second infrastructure element; determining a movement information based on the observed state of the first infrastructure element, the predicted state of the second infrastructure element and a relation between the location of the first infrastructure element and a location of the second infrastructure element; and generating a message including the movement information.

In Example 36, the infrastructure state prediction method of Claim 35 is disclosed, wherein the infrastructure state model further includes an identifier for each infrastructure element, and wherein the predicted state of the second infrastructure element is further determined using an infrastructure element identifier.

In Example 37, the infrastructure state prediction method of Claim 35 or 36 is disclosed, wherein the movement information includes at least one of a vehicle velocity instruction, a vehicle acceleration instruction, a vehicle timing instruction, a route instruction, or a timing of the predicted state of the second infrastructure element.

In Example 38, the infrastructure state prediction method of Claim 37 is disclosed, wherein the predicted state is an illumination of a red, a yellow, or a green light.

In Example 39, the infrastructure state prediction method of Claim 37 is disclosed, wherein the predicted state is a timing of a change from illuminating a light of a first color to illuminating a light of a second color.

In Example 40, the infrastructure state prediction method of Claim 37 is disclosed, wherein the predicted state is a timing of a change in illumination from any one of a red, yellow, or green light, to any other of the red, yellow, or green light.

In Example 41, the infrastructure state prediction method of any one of Claims 35 to 40 is disclosed, wherein the measurement information includes a location and an observed state of a first infrastructure element.

In Example 42, the infrastructure state prediction method of Claim 41 is disclosed, wherein the measurement information corresponds to an observed illumination of a red, a yellow, or a green light.

In Example 43, the infrastructure state prediction method of any one of Claims 35 to 40 is disclosed, wherein the measurement information includes image data corresponding to at least one of a location and an observed state of a first infrastructure element.

In Example 44, the infrastructure state prediction method of any one of Claims 34 to 43 is disclosed, wherein the measurement information further corresponds to at least one of a presence of a vehicle in a vicinity of the infrastructure element, a number of vehicles in a vicinity of the infrastructure element, a direction of travel of one or more vehicles in a vicinity of the infrastructure element, a presence of a pedestrian in a vicinity of the infrastructure element, a number of pedestrians in a vicinity of the infrastructure element, a direction of travel of one or more pedestrians in a vicinity of the infrastructure element, or any combination thereof.

In Example 45, the infrastructure state prediction method of any one of Claims 35 to 44 is disclosed, wherein each infrastructure state model further corresponds to a plurality of state timings of an infrastructure element.

In Example 46, the infrastructure state prediction method of any one of Claims 35 to 45 is disclosed, wherein a plurality of infrastructure elements are associated as a traffic control system.

In Example 47, the infrastructure state prediction method of Claim 46 is disclosed, wherein a state timing of a first infrastructure element in the traffic control system is dependent on a state timing of a second infrastructure element in the traffic control system.

In Example 48, the infrastructure state prediction method of any one of Claims 35 to 47 is disclosed, further including comparing the received measurement information to the state timing of a corresponding state model, and if the received measurement information conflicts with corresponding state timing, modifying the state model.

In Example 49, the infrastructure state prediction method of any one of Claims 35 to 47 is disclosed, further including comparing the received measurement information to the state timing of a corresponding state model, and if the received measurement information conflicts with corresponding state timing, modifying the state timing.

In Example 50, the infrastructure state prediction method of any one of Claims 35 to 47 is disclosed, further including comparing the received measurement information to the state timing of a corresponding state model, and if the received measurement information conflicts with corresponding state timing, estimating a reliability of the received measurement information.

In Example 51, the infrastructure state prediction method of Claim 50 is disclosed, further including electing to modify or not to modify the state timing to correspond to the received measurement information based on the estimated reliability of the received measurement information.

In Example 52, the infrastructure state prediction method of any one of Claims 35 to 51 is disclosed, wherein the state timing includes a timing of one or more light illumination phases of the infrastructure element.

In Example 53, the infrastructure state prediction method of any one of Claims 35 to 52 is disclosed, further including determining from the received measurement data whether an infrastructure element operates according to an actuator control mode, and if the one or more processors determine that the infrastructure element operates according to an actuator control mode, determining a state timing of the actuator control mode.

In Example 54, the infrastructure state prediction method of Claim 53 is disclosed, further including determining whether an infrastructure element operates according to an actuator control mode based on received measurement data corresponding to a pedestrian switch.

In Example 55, the infrastructure state prediction method of Claim 53 is disclosed, further including determining whether an infrastructure element operates according to an actuator control mode based on received measurement data corresponding to a presence of a pedestrian.

In Example 56, the infrastructure state prediction method of Claim 53 is disclosed, further including determining whether an infrastructure element operates according to an actuator control mode based on received measurement data that conflicts with the corresponding state timing.

In Example 57, the infrastructure state prediction method of any one of Claims 53 to 56 is disclosed, wherein the actuator control mode is a state timing for the infrastructure element, and wherein the actuator control mode is executed upon sensor detection of a vehicle or pedestrian.

In Example 58, the infrastructure state prediction method of any one of Claims 53 to 56 is disclosed, wherein the actuator control mode is a state timing for the infrastructure element, and wherein the actuator control mode is executed upon actuation of a switch.

In Example 59, the infrastructure state prediction method of any one of Claims 35 to 58 is disclosed, wherein the movement information includes a prediction of the infrastructure element state.

In Example 60, the infrastructure state prediction method of any one of Claims 35 to 59 is disclosed, wherein the movement information includes a vehicle instruction based on a prediction of the infrastructure element state.

In Example 61, the infrastructure state prediction method of any one of Claims 35 to 60 is disclosed, further including determining the movement information according to one or more of a plurality of operational modes.

In Example 62, the infrastructure state prediction method of Claim 61 is disclosed, wherein the plurality of operational modes include at least one of a fuel conservation mode, a battery conservation mode, a stopping reduction mode, or a braking reduction mode.

In Example 63, the infrastructure state prediction method of any one of Claims 35 to 62 is disclosed, wherein the one or more processors are configured to control the transmitter to transmit according to an Internet of Things technology.

In Example 64, the infrastructure state prediction method of any one of Claims 35 to 62 is disclosed, wherein the one or more processors are configured to control the transmitter to transmit on a 5G Radio Access Technology.

In Example 65, the infrastructure state prediction method of any one of Claims 35 to 64 is disclosed, wherein the infrastructure state model is a conceptual infrastructure state model.

In Example 66, the infrastructure state prediction method of any one of Claims 35 to 64 is disclosed, wherein the infrastructure state model is a logical infrastructure state model.

In Example 67, the infrastructure state prediction method of any one of Claims 35 to 64 is disclosed, wherein the infrastructure state model is a physical infrastructure state model.

In Example 68, the infrastructure state prediction method of any one of Claims 35 to 64 is disclosed, wherein the infrastructure state prediction method is configured as a cloud server.

In Example 69, an means for infrastructure state prediction is disclosed including a data storage means onto which an infrastructure state model corresponding to a location and a state timing of a plurality of infrastructure elements is stored; one or more processing means, communicatively coupled to the data storage means, the one or more processing means for: receiving measurement information representing a location and an observed state of a first infrastructure element; determining a predicted a state of a second infrastructure element based on a state timing corresponding to the second infrastructure element; determining a movement information based on the observed state of the first infrastructure element, the predicted state of the second infrastructure element and a relation between the location of the first infrastructure element and a location of the second infrastructure element; and generating a message including the movement information.

In Example 70, the means for infrastructure state prediction of Claim 69 is disclosed, wherein the infrastructure state model further includes an identifier for each infrastructure element, and wherein the predicted state of the second infrastructure element is further determined using an infrastructure element identifier.

In Example 71, the means for infrastructure state prediction of Claim 69 or 70 is disclosed, wherein the movement information includes at least one of a vehicle velocity instruction, a vehicle acceleration instruction, a vehicle timing instruction, a route instruction, or the predicted state and of the second infrastructure element.

In Example 72, the means for infrastructure state prediction of Claim 71 is disclosed, wherein the predicted state is an illumination of a red, a yellow, or a green light.

In Example 73, the means for infrastructure state prediction of Claim 71 is disclosed, wherein the predicted state is a timing of a change from illuminating a light of a first color to illuminating a light of a second color.

In Example 74, the means for infrastructure state prediction of Claim 71 is disclosed, wherein the predicted state is a timing of a change in illumination from any one of a red, yellow, or green light, to any other of the red, yellow, or green light.

In Example 75, the means for infrastructure state prediction of any one of Claims 69 to 74 is disclosed, wherein the measurement information includes a location and an observed state of a first infrastructure element.

In Example 76, the means for infrastructure state prediction of Claim 75 is disclosed, wherein the observed measurement information corresponds to an observed illumination of a red, a yellow, or a green light.

In Example 77, the means for infrastructure state prediction of any one of Claims 69 to 74 is disclosed, wherein the measurement information includes image data corresponding to at least one of a location and an observed state of a first infrastructure element.

In Example 78, the means for infrastructure state prediction of any one of Claims 69 to 77 is disclosed, wherein the measurement information further corresponds to at least one of a presence of a vehicle in a vicinity of the infrastructure element, a number of vehicles in a vicinity of the infrastructure element, a direction of travel of one or more vehicles in a vicinity of the infrastructure element, a presence of a pedestrian in a vicinity of the infrastructure element, a number of pedestrians in a vicinity of the infrastructure element, a direction of travel of one or more pedestrians in a vicinity of the infrastructure element, or any combination thereof.

In Example 79, the means for infrastructure state prediction of any one of Claims 69 to 78 is disclosed, wherein the infrastructure state model further corresponds to a plurality of state timings of an infrastructure element.

In Example 80, the means for infrastructure state prediction of any one of Claims 69 to 79 is disclosed, wherein a plurality of infrastructure elements are associated as a traffic control system.

In Example 81, the means for infrastructure state prediction of Claim 80 is disclosed, wherein a state timing of the first infrastructure element is dependent on a state timing of the second infrastructure element in the traffic control system.

In Example 82, the means for infrastructure state prediction of any one of Claims 69 to 81 is disclosed, wherein the one or more processing means are further configured for comparing the received measurement information to the state timing of a corresponding state model, and if the received measurement information conflicts with corresponding state timing, to modify the state model.

In Example 83, the means for infrastructure state prediction of any one of Claims 69 to 81 is disclosed, wherein the one or more processing means are further configured for comparing the received measurement information to the state timing of a corresponding state model, and if the received measurement information conflicts with corresponding state timing, to modify the state timing.

In Example 84, the means for infrastructure state prediction of any one of Claims 69 to 81 is disclosed, wherein the one or more processing means are further configured for comparing the received measurement information to the state timing of a corresponding state model, and if the received measurement information conflicts with corresponding state timing, to estimate a reliability of the received measurement information.

In Example 85, the means for infrastructure state prediction of Claim 84 is disclosed, wherein the one or more processing means are further configured for electing to modify or not to modify the state timing to correspond to the received measurement information based on the estimated reliability of the received measurement information.

In Example 86, the means for infrastructure state prediction of any one of Claims 69 to 85 is disclosed, wherein the state timing includes a timing of one or more light illumination phases of the infrastructure element.

In Example 87, the means for infrastructure state prediction of any one of Claims 69 to 86 is disclosed, wherein the one or more processing means are further configured for determining from the received measurement data whether an infrastructure element operates according to an actuator control mode, and if the one or more processing means determine that the infrastructure element operates according to an actuator control mode, to determine a state timing of the actuator control mode.

In Example 88, the means for infrastructure state prediction of Claim 87 is disclosed, wherein the one or more processing means are configured for determining whether an infrastructure element operates according to an actuator control mode based on received measurement data corresponding to a pedestrian switch.

In Example 89, the means for infrastructure state prediction of Claim 87 is disclosed, wherein the one or more processing means are configured for determining whether an infrastructure element operates according to an actuator control mode based on received measurement data corresponding to a presence of a pedestrian.

In Example 90, the means for infrastructure state prediction of Claim 87 is disclosed, wherein the one or more processing means are configured for determining whether an infrastructure element operates according to an actuator control mode based on received measurement data that conflicts with the corresponding state timing.

In Example 91, the means for infrastructure state prediction of any one of Claims 87 to 90 is disclosed, wherein the actuator control mode is a state timing for the infrastructure element, and wherein the actuator control mode is executed upon sensor detection of a vehicle or pedestrian.

In Example 92, the means for infrastructure state prediction of any one of Claims 87 to 90 is disclosed, wherein the actuator control mode is a state timing for the infrastructure element, and wherein the actuator control mode is executed upon actuation of a switch.

In Example 93, the means for infrastructure state prediction of any one of Claims 69 to 92 is disclosed, wherein the movement information includes the prediction of an infrastructure element state.

In Example 94, the means for infrastructure state prediction of any one of Claims 69 to 93 is disclosed, wherein the movement information includes a vehicle instruction based on the prediction of an infrastructure element state.

In Example 95, the means for infrastructure state prediction of any one of Claims 69 to 94 is disclosed, wherein one or more processing means are further configured for determining the movement information according to one or more of a plurality of operational modes.

In Example 96, the means for infrastructure state prediction of Claim 95 is disclosed, wherein the plurality of operational modes include at least one of a fuel conservation mode, a battery conservation mode, a stopping reduction mode, or a braking reduction mode.

In Example 97, the means for infrastructure state prediction of any one of Claims 69 to 96 is disclosed, wherein the one or more processing means are configured to control the transceiver to transmit and receive according to an Internet of Things technology.

In Example 98, the means for infrastructure state prediction of any one of Claims 69 to 96 is disclosed, wherein the one or more processing means are configured to control the transceiver to transmit and receive on a 5G Radio Access Technology.

In Example 99, the means for infrastructure state prediction of any one of Claims 69 to 98 is disclosed, wherein the infrastructure state model is a conceptual infrastructure state model.

In Example 100, the means for infrastructure state prediction of any one of Claims 69 to 98 is disclosed, wherein the infrastructure state model is a logical infrastructure state model.

In Example 101, the means for infrastructure state prediction of any one of Claims 69 to 98 is disclosed, wherein the infrastructure state model is a physical infrastructure state model.

In Example 102, the means for infrastructure state prediction of any one of Claims 69 to 101 is disclosed, wherein the means for infrastructure state prediction is configured as a cloud server.

In Example 103, an infrastructure state prediction system is disclosed including: an infrastructure state prediction device, including a memory device onto which an infrastructure state model corresponding to a location and a state timing of a plurality of infrastructure elements is stored; one or more processors, communicatively coupled to the memory device and configured to receive measurement information representing a location and an observed state of a first infrastructure element; determine a predicted state of a second infrastructure element based on a state timing corresponding to a second infrastructure element; determine a movement information based on the observed state of the first infrastructure element, the predicted state of the second infrastructure element and a relation between the location of the first infrastructure element and a location of the second infrastructure element; and generate a message including the movement information; and an infrastructure state prediction receiving device, including a display; one or more processors, communicatively couples to a receiver, and configured to receive the state instruction; determine a vehicle instruction corresponding to the received movement information; and control the display to display the vehicle instruction.

In Example 104, a non-transient computer readable medium is disclosed, configured to cause one or more processors to perform the method of: receiving measurement information representing a location and an observed state of a first infrastructure element; determining a predicted state of a second infrastructure element based on a state timing corresponding to the second infrastructure element; determining a movement information based on the observed state of the first infrastructure element, the predicted state of the second infrastructure element and a relation between the location of the first infrastructure element and a location of the second infrastructure element; and generating a message including the movement information.

In Example 105, a non-transient computer readable medium is disclosed, configured to cause one or more processors to perform the method of any one of claims 35 to 68.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. An infrastructure state prediction device comprising:
   a memory device onto which an infrastructure state model corresponding to a location and a state timing of a plurality of infrastructure elements is stored;
   one or more processors, communicatively coupled to the memory device and configured to:
   receive measurement information from a vehicle, wherein the measurement information represents a location and an observed state of a first infrastructure element;
   determine a predicted state of a second infrastructure element based on a state timing corresponding to a second infrastructure element;
   determine a movement information based on the observed state of the first infrastructure element, the predicted state of the second infrastructure element and a relation between the location of the first infrastructure element and a location of the second infrastructure element;
   generate a message comprising the movement information; and
   control a wireless transmitter to send the message to the vehicle;
   wherein the movement information comprises at least one of a vehicle velocity instruction, a vehicle acceleration instruction, a vehicle timing instruction, a route instruction, or a timing of the predicted state of the second infrastructure element.

2. The infrastructure state prediction device of claim 1, wherein the infrastructure state model further comprises an identifier for each infrastructure element, and wherein the predicted state of the second infrastructure element is further determined using an infrastructure element identifier.

3. The infrastructure state prediction device of claim 1, wherein the predicted state is a timing of a change from illuminating a light of a first color to illuminating a light of a second color.

4. The infrastructure state prediction device of claim 1, wherein the measurement information comprises a location and an observed state of a first infrastructure element.

5. The infrastructure state prediction device of claim 1, wherein the measurement information corresponds to an observed illumination of a red, a yellow, or a green light.

6. The infrastructure state prediction device of claim 1, wherein the measurement information further corresponds to at least one of a presence of a vehicle in a vicinity of the infrastructure element, a number of vehicles in a vicinity of the infrastructure element, a direction of travel of one or more vehicles in a vicinity of the infrastructure element, a presence of a pedestrian in a vicinity of the infrastructure element, a number of pedestrians in a vicinity of the infrastructure element, a direction of travel of one or more pedestrians in a vicinity of the infrastructure element, or any combination thereof.

7. The infrastructure state prediction device of claim 1, wherein the infrastructure state model further comprises a plurality of state timings of an infrastructure element, wherein a plurality of infrastructure elements are associated as a traffic control system.

8. The infrastructure state prediction device of claim 7, wherein a state timing of a first infrastructure element in the traffic control system is dependent on a state timing of a second infrastructure element in the traffic control system.

9. The infrastructure state prediction device of claim 1, wherein the one or more processors are further configured to compare the received measurement information to the state timing of a corresponding infrastructure element, and if the received measurement information conflicts with corresponding state timing, to modify the state model.

10. The infrastructure state prediction device of claim 1, wherein the one or more processors are further configured to compare the received measurement information to the state timing of a corresponding infrastructure element, and if the received measurement information conflicts with corresponding state timing, to modify the state timing.

11. The infrastructure state prediction device of claim 1, wherein the one or more processors are further configured to compare the received measurement information to the state timing of a corresponding infrastructure element, and if the received measurement information conflicts with corresponding state timing, to estimate a reliability of the received measurement information.

12. The infrastructure state prediction device of claim 1, wherein the one or more processors are further configured to determine from the received measurement data whether an infrastructure element operates according to an actuator control mode, and if the one or more processors determine that the infrastructure element operates according to an actuator control mode, to determine a state timing of the actuator control mode.

13. The infrastructure state prediction device of claim 12, wherein the one or more processors are configured to determine whether an infrastructure element operates according to an actuator control mode based on received measurement data corresponding to a pedestrian switch.

14. An infrastructure state prediction method comprising:

receiving measurement information from a vehicle, wherein the measurement information represents a location and an observed state of a first infrastructure element;

determining a predicted state of a second infrastructure element based on a state timing corresponding to the second infrastructure element;

determining a movement information based on the observed state of the first infrastructure element, the predicted state of the second infrastructure element and a relation between the location of the first infrastructure element and a location of the second infrastructure element;

generating a message comprising the movement information; and controlling a wireless transmitter to send the message to the vehicle;

wherein the movement information comprises at least one of a vehicle velocity instruction, a vehicle acceleration instruction, a vehicle timing instruction, a route instruction, or a timing of the predicted state of the second infrastructure element.

15. The infrastructure state prediction method of claim 14, wherein the infrastructure state model further comprises an identifier for each infrastructure element, and wherein the predicted state of the second infrastructure element is further determined using an infrastructure element identifier.

16. The infrastructure state prediction method of claim 14, wherein the predicted state is a timing of a change in illumination from any one of a red, yellow, or green light, to any other of the red, yellow, or green light.

17. The infrastructure state prediction method of claim 14, wherein the measurement information further corresponds to at least one of a presence of a vehicle in a vicinity of the infrastructure element, a number of vehicles in a vicinity of the infrastructure element, a direction of travel of one or more vehicles in a vicinity of the infrastructure element, a presence of a pedestrian in a vicinity of the infrastructure element, a number of pedestrians in a vicinity of the infrastructure element, a direction of travel of one or more pedestrians in a vicinity of the infrastructure element, or any combination thereof.

18. A non-transitory computer readable medium, configured to cause one or more processors to perform the method of:

receiving measurement information from a vehicle, wherein the measurement information represents a location and an observed state of a first infrastructure element;

determining a predicted state of a second infrastructure element based on a state timing corresponding to the second infrastructure element;

determining a movement information based on the observed state of the first infrastructure element, the predicted state of the second infrastructure element and a relation between the location of the first infrastructure element and a location of the second infrastructure element;

generating a message comprising the movement information; and sending the message to the vehicle;

wherein the movement information comprises at least one of a vehicle velocity instruction, a vehicle acceleration instruction, a vehicle timing instruction, a route instruction, or a timing of the predicted state of the second infrastructure element.

\* \* \* \* \*